US009405124B2

(12) United States Patent
Hirsch et al.

(10) Patent No.: US 9,405,124 B2
(45) Date of Patent: Aug. 2, 2016

(54) METHODS AND APPARATUS FOR LIGHT FIELD PROJECTION

(71) Applicants: Matthew Hirsch, Somerville, MA (US); Gordon Wetzstein, Cambridge, MA (US); Ramesh Raskar, Cambridge, MA (US); Vincent Lee, Cambridge, MA (US)

(72) Inventors: Matthew Hirsch, Somerville, MA (US); Gordon Wetzstein, Cambridge, MA (US); Ramesh Raskar, Cambridge, MA (US); Vincent Lee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 118 days.

(21) Appl. No.: 14/248,539

(22) Filed: Apr. 9, 2014

(65) Prior Publication Data

US 2014/0300869 A1     Oct. 9, 2014

Related U.S. Application Data

(60) Provisional application No. 61/810,221, filed on Apr. 9, 2013.

(51) Int. Cl.
*G03B 21/00* (2006.01)
*G02B 27/22* (2006.01)
(Continued)

(52) U.S. Cl.
CPC .......... *G02B 27/2214* (2013.01); *G02B 3/0068* (2013.01); *G03B 21/00* (2013.01); *H04N 5/7416* (2013.01); *H04N 13/0459* (2013.01); *H04N 13/0404* (2013.01); *H04N 13/0406* (2013.01)

(58) Field of Classification Search
CPC ............. G02B 27/2214; G02B 3/0068; H04N 13/0459; H04N 13/00; H04N 5/7416; H04N 13/0228; H04N 13/0404; H04N 13/0406; G03B 21/608; G03B 21/00; G03B 21/62; G03B 21/005; G03B 21/625; G03B 35/22; G03B 21/602; G03B 25/02
See application file for complete search history.

(56) References Cited

U.S. PATENT DOCUMENTS

| 2,351,034 | A | | 8/1940 | Gabor | |
|---|---|---|---|---|---|
| 5,855,425 | A | * | 1/1999 | Hamagishi | ......... G02B 27/2214 348/E13.029 |

(Continued)

OTHER PUBLICATIONS

Lanman, D., et al., 2010, Content-adaptive parallax barriers: optimizing dual-layer 3D displays using low-rank light field factorization. Proceedings of ACM SIGGRAPH Asia 2010 Transactions on Graphics, Transactions on Graphics (TOG), vol. 29 Issue 6, Dec. 2010.

(Continued)

*Primary Examiner* — Sultan Chowdhury
*Assistant Examiner* — Magda Cruz
(74) *Attorney, Agent, or Firm* — Stephen R. Otis

(57) ABSTRACT

In exemplary implementations of this invention, light from a light field projector is transmitted through an angle-expanding screen to create a glasses-free, 3D display. The display can be horizontal-only parallax or full parallax. In the former case, a vertical diffuser may positioned in the optical stack. The angle-expanding screen may comprise two planar arrays of optical elements (e.g., lenslets or lenticules) separated from each other by the sum of their focal distances. Alternatively, a light field projector may project light rays through a focusing lens onto a diffuse, transmissive screen. In this alternative approach, the light field projector may comprise two spatial light modulators (SLMs). A focused image of the first SLM, and a slightly blurred image of the second SLM, are optically combined on the diffuser, creating a combined image that has a higher spatial resolution and a higher dynamic range than either of two SLMs.

17 Claims, 13 Drawing Sheets

(51) Int. Cl.
*H04N 5/74* (2006.01)
*G02B 3/00* (2006.01)
*H04N 13/04* (2006.01)

(56) References Cited

U.S. PATENT DOCUMENTS

| | | |
|---|---|---|
| 2010/0259604 A1 | 10/2010 | Surman |
| 2011/0285968 A1* | 11/2011 | Huang .................. G03B 35/24 353/31 |
| 2011/0285969 A1* | 11/2011 | Liao .................. G03B 21/2033 353/33 |
| 2012/0257018 A1* | 10/2012 | Shigemura ......... G02B 27/2214 348/46 |
| 2013/0170220 A1 | 7/2013 | Bueeler et al. |
| 2015/0035880 A1 | 2/2015 | Heide et al. |

OTHER PUBLICATIONS

Lee, D 1999, Learning the parts of objects by non-negative matrix factorization. Nature 401, 788-791 (Oct. 21, 1999).

Urey, H., 2011, State of the Art in Stereoscopic and Autostereoscopic Displays. Proceedings of the IEEE, vol. 99, Issue 4, 540-555, Apr. 2011.

* cited by examiner

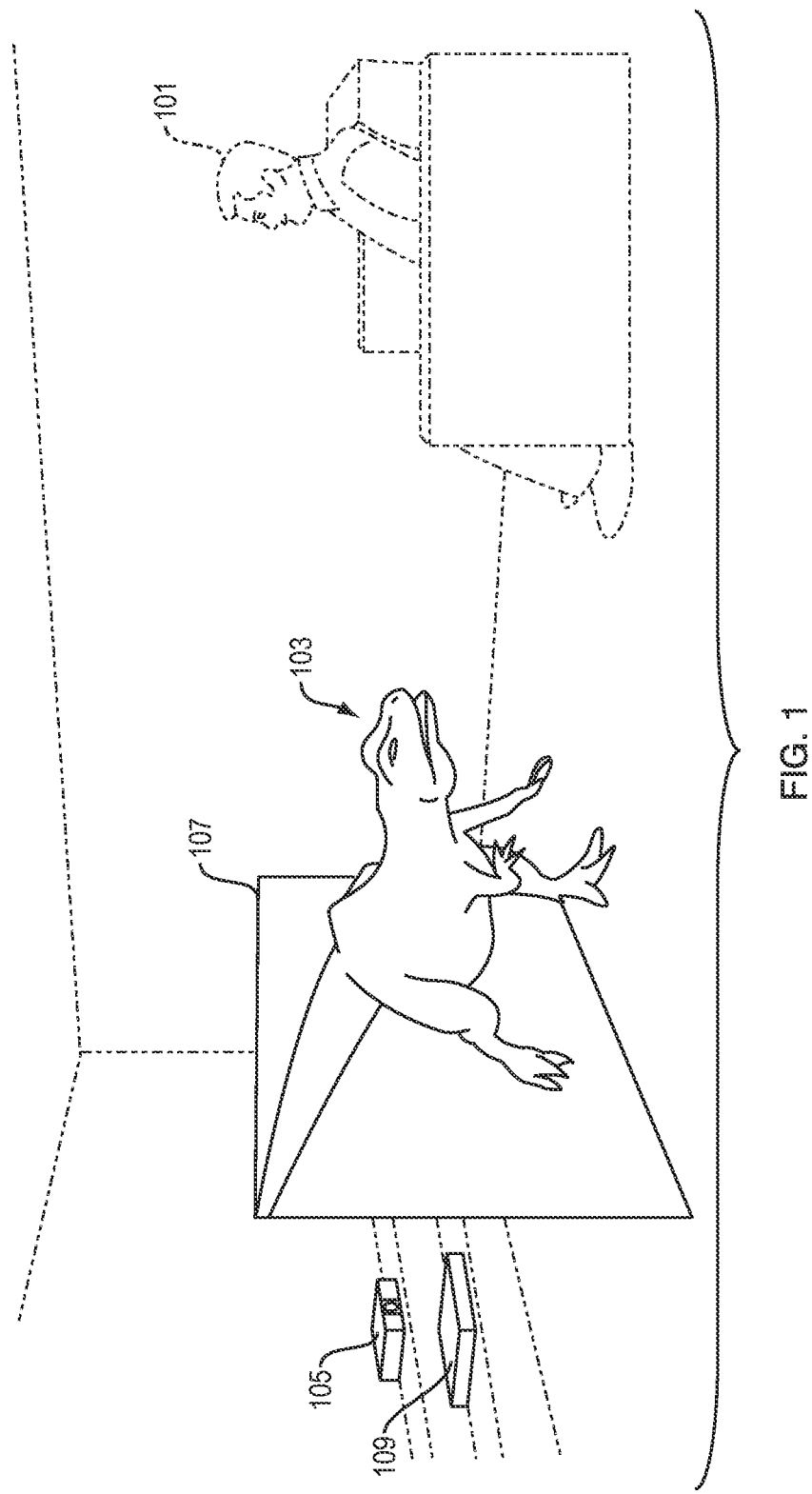

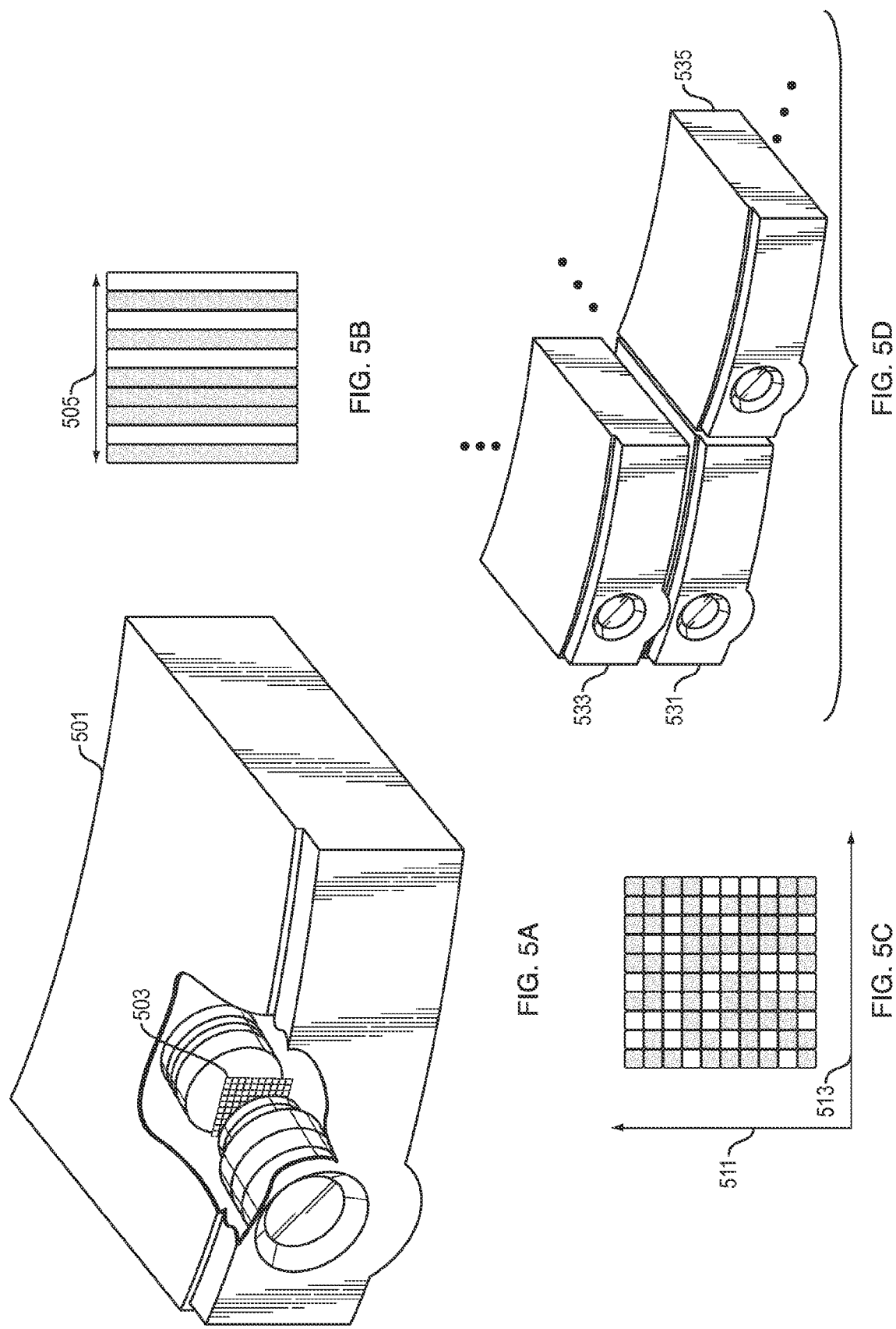

METHODS AND APPARATUS FOR LIGHT FIELD PROJECTION

RELATED APPLICATIONS

This application is a non-provisional of, and claims the benefit of the filing date of, U.S. Provisional Application No. 61/810,221, filed Apr. 9, 2013, the entire disclosure of which is herein incorporated by reference.

FIELD OF THE TECHNOLOGY

The present invention relates generally to light field projection.

BACKGROUND

Projection technology for 3D displays in movie theaters is conventionally based on stereoscopic principles. An image pair depicting a scene from slightly different perspectives is displayed such that observers perceive each of these images with a different eye. Often, this is achieved by optically encoding the image pair in different polarization states or color spectra and then decoding it with special glasses worn by the observer. This approach can create viewer discomfort; furthermore, the correct perspective is only observed from a single sweet-spot in center of the theater.

SUMMARY

In exemplary implementations of this invention, a light field projector projects a set of light rays onto an angle-expanding screen. The set of light rays strike a first side of the screen at a set of entrance angles and exit a different, second side of the screen at a set of exit angles. Over at least a range of the entrance angles: (a) the exit angles are a function of the entrance angles; and (b) the magnitude of the exit angle of a given light ray is larger than the magnitude of the entrance angle of the given light ray, if the entrance angle is not zero. For example, the exit angles may be a linear function of the entrance angles, over at least a range of entrance angles. In this paragraph, angles are defined relative to a direction that is perpendicular to the screen.

Light from the light field projector is transmitted through the angle-expanding screen, and creates a glasses-free, 3D display. The display can be horizontal-only parallax. Alternately, the display can be full parallax.

If the glasses-free, 3D display is horizontal-only parallax, a vertical diffuser may positioned before or after (and proximate to) the angle-expanding screen. This allows a human viewer to change vertical position and still be able to see the display.

The angle-expanding screen may comprise a first planar array of optical elements and a second planar array of optical elements. For example, the optical elements may be lenslets or lenticules. The two planar arrays may be separated from each other by the sum of their focal distances.

The light field projector is configured to project a set of light rays onto a region of a plane such that: (i) a first subset of the set of light rays strikes the region at a first angle, and a second subset of the set of light rays strikes the region at a second angle, the first and second angles being different; (ii) the intensity of the lights rays in the first subset varies as a first function of time, and the intensity of the light rays in the second subset can varies as a second function of time, and (iii) the projector can control the intensity of the first subset of rays independently of the intensity of the second subset of rays. In this paragraph, angles are defined relative to a direction that is perpendicular to the plane. For example, the region of the plane may consist of a single pixel. Also, for example, the plane may be co-located with an angle-expanding screen or a diffusing screen.

The light field projector may be implemented in different ways, depending on the particular embodiment of this invention. For example, the light field projector may use two spatial light modulators (SLMs) to generate the projected light rays. The SLMs may display time-varying spatial light modulation patterns, and may be either transmissive or reflective. Alternately, the light field projector may use a coded aperture.

Advantageously, the projective system may generate a light field display that provides correct views for a wide range of perspectives and do not require an observer to wear special glasses.

In some implementations, only one light field projector is used with an angle-expanding screen. In other implementations, more than one light field projector is used with an angle-expanding screen.

Alternatively, a light field projector may project light rays through a focusing lens onto a diffuse, transmissive screen. In this alternative approach, the light field projector may comprise two spatial light modulators (SLMs). Light from the first SLM may form a focused image on the diffuser; and light from the second SLM may form a slightly blurred image on the diffuser. If a human, on the opposite side of the diffuser than the projector, observes the diffuser, the human will see a combined image that is the summation of the two images from the two SLMs. This combined image may have a higher spatial resolution and a higher dynamic range than is exhibited by either of the two respective SLMs.

In exemplary implementations of this invention (including with an angle-expanding screen or a diffusive screen), the projective system is well-suited for projecting large-scale displays. For example, the display can be projected onto a screen in a movie theater, or onto a large wall-mounted screen.

The description of the present invention in the Summary and Abstract sections hereof is just a summary. It is intended only to give a general introduction to some illustrative implementations of this invention. It does not describe all of the details of this invention. This invention may be implemented in many other ways.

BRIEF DESCRIPTION OF THE DRAWINGS

FIG. 1 is a conceptual sketch of a user watching a glasses-free 3D display of a dinosaur.

In FIG. 2A, the screen comprises two lenslet sheets with evenly pitched lenslets. In FIG. 2B, the screen comprises two lenslet sheets with unevenly pitched lenslets.

In FIGS. 3B and 3E, two lenslet sheets in the angle-expanding screen have different pitch lengths, so that the light angles are not only expanded by, but also focused by, the angle-expanding screen. This causes the viewing zone to be at a comfortable distance from the screen.

In FIGS. 3A and 3D, two lenslet sheets in the angle-expanding screen have equal pitch lengths. This causes the viewing zone to be too close to the screen.

In FIGS. 3C and 3F, two lenslet sheets in the angle-expanding screen have equal pitch lengths. However, a fresnel lens is added to compensate. This causes the viewing zone to be at a comfortable distance from the screen

FIG. 5A shows a single light field projector.

FIG. 5B shows a 1D coded aperture.

FIG. 5C shows a 2D coded aperture.

FIG. 5D shows a system with multiple light field projectors.

In FIG. 9, an image SLM (spatial light modulator) is conjugate to the angle-expanding screen, and an aperture SLM is conjugate to the output of a light engine.

In FIG. 10, the image SLM and aperture SLM are adjacent to each other, and approximately conjugate to both the angle-expanding screen and the output of a light engine.

Figure 2A:
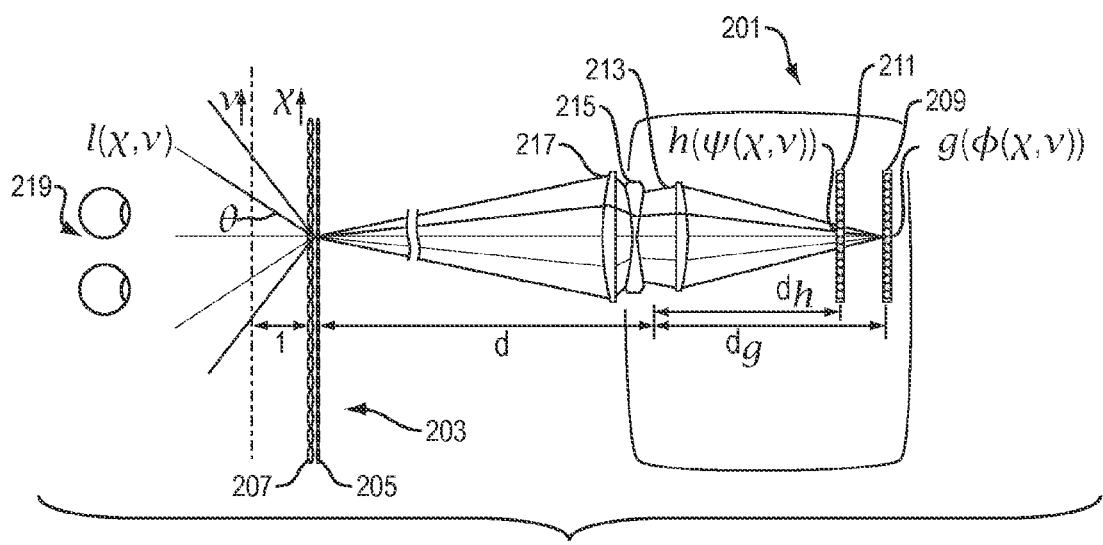
FIG. 2A shows a light field projector behind an angle-expanding screen.

The above Figures show some illustrative implementations of this invention, or provide information that relates to those implementations. However, this invention may be implemented in many other ways. The above Figures do not show all of the details of this invention.

DETAILED DESCRIPTION

In exemplary implementations, this invention comprises a compressive light field projection system. The system includes a passive, angle-expanding screen and a single high-speed light field projector, and one or more computer processors for performing light field factorization algorithms. The factorization routines: (a) can exploit redundancy in target content (b) cab be used to calculate light fields in a compressed form, (b) can be low-rank, and (c) can directly map to pixel states of the optical system, thereby not only reducing the memory footprint needed to store the light fields but also the number of projection devices. Hence, the system may be compressive in a computational and an optical sense.

Alternately, multiple light field projectors may be used with one angle-expanding screen.

The projection system may be used to produce a large-scale light field display for glasses-free 3D viewing. For example, the system may be used to project a glasses-free 3D display: (a) on a large movie theater screen; (b) a large wall screen; or (c) in a living room or home theater.

The angle-expanding screen optically expands the field of view of a light field projected on it. The screen can be thin and completely passive. In some implementations, the screen is transmissive; in others, the screen is reflective.

FIG. 1 is a conceptual sketch of a user watching a glasses-free 3D display of a dinosaur, in an exemplary implementation of this invention. In the example shown in FIG. 1: A user 101 watches an automultiscopic display 103 of a dinosaur. The display 103 is produced by light projected by a light field projector 105 onto an angle-expanding screen 107. One or more computer processors 109 housed in a computer can control the light field projector 105 and calculate light field factorizations.

Conventional glasses-free 3D projection systems can require dozens of projectors. In contrast, in exemplary implementations of this invention which use a compressive display approach, the number of light field projectors can be reduced (e.g., to a single projector). In turn, the reduced number of projectors can decrease cost and energy consumption, and minimize required space and produced heat.

FIG. 2A shows a light field projector 201 behind an angle-expanding screen 203. In the example shown in FIG. 2A: The light field projector 201 includes two spatial light modulators (SLMs) 209, 211, and a projection lens.

In the example shown in FIG. 2A, the projection lens comprises three lenses 213, 215, 217. However, the projection lens may be implemented in many different ways. For example, the projection lens may be implemented as a single lens.

More generally, depending on the particular implementation of this invention, any logical two surface optical device may be implemented with multiple surfaces, which may be desirable for reasons of practicality or performance. For example, a single functional "lens" may be implemented as a set of 4 lenses.

In the example shown in FIG. 2A, the two SLMs g and h (209, 211) synthesize a light field inside the light field projector 201. Light from SLM 209 travels through SLM 211, then through the relays lenses 213, 215, then through the projection lens, then through the angle-expanding screen 203 and then to a human viewer 219. The projection lens focuses the light; and is positioned so that an SLM image is focused on the angle-expanding screen 203. In this example, the angle-expanding screen comprises two lenslet sheets 205, 207 that form an array of angle-expanding pixels. These pixels expand the field of view of the emitted light field for an observer 219 on the other side of screen.

Figure 2B:
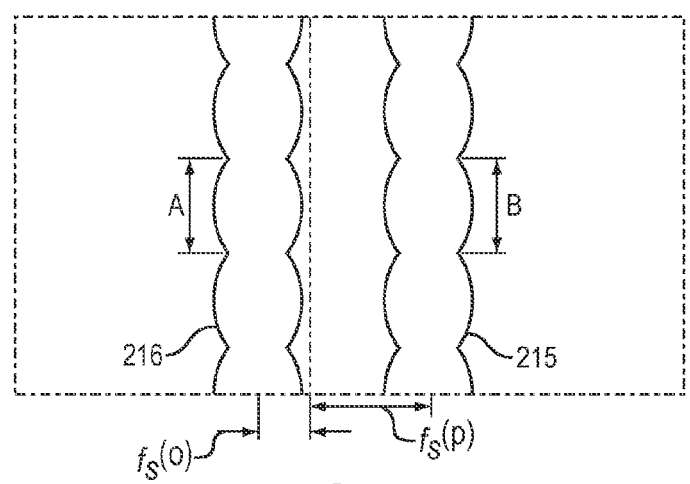
FIGS. 2B and 2C each show a portion of an angle-expanding screen.
Figure 2C:
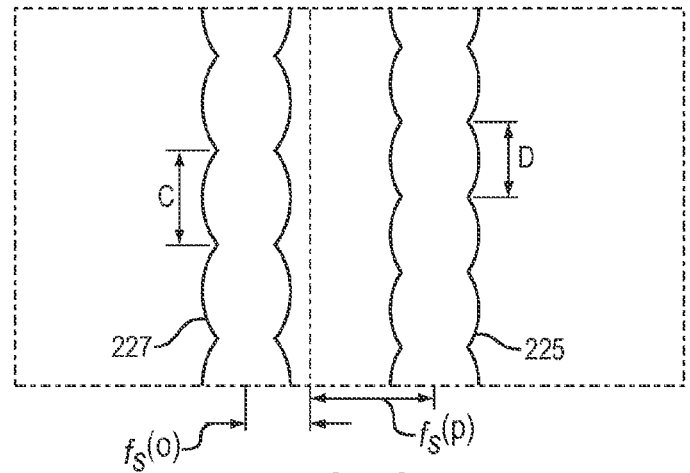

FIGS. 2B and 2C each show a portion of an angle-expanding screen. In FIG. 2B, the screen comprises two lenslet arrays 215, 216 with evenly pitched lenslets. The pitch A of lenslet array 216 is equal to the pitch B of lenslet array 215. In FIG. 2C, the screen comprises two lenslet arrays 225, 227 with unevenly pitched lenslets. The pitch C of lenslet array 227 is greater than the pitch D of lenslet array 225. In both FIGS. 2B and 2C, the distance between the respective middle planes of the two lenslet sheets is equal to the sum of their focal lengths ($f_s(o)+f_p(o)$). If the lenslet arrays are not evenly pitched, then the overall dimensions of the arrays may be different (because, in that case, one of the arrays has a shorter pitch length than the other).

The screen in FIGS. 2A, 2B and 2C may be implemented by putting two sheets of lenslets adjacent to each other, in some cases with transparent sheet(s) between them. Alternately, lenticules may be used instead of lenslets.

The following is a mathematical derivation of optical image formation and related optimization techniques, which are used in exemplary implementations of this invention. The formulations are derived in 2D "flatland", but extensions to the full 4D case are straightforward.

In exemplary implementations of this invention, a light field projector emits a view-dependent 4D light field. The projector emits a light field and not just a 2D image. Also, the screen preserves and enlarges the incident angular variation. (This is unlike many conventional projection setups, which optically average an incident light field in the angular domain and eliminate high frequency directional variation.)

In the example of this invention shown in FIG. 2A, the angle-expanding screen 203 produces an image $$\tilde{l}(x,v) = g(\phi(x,v))  \quad \text{Eq. 1}$$

where each light ray (x,v) on the observer side of the screen is mapped to SLM 209 inside the projector by the function $\phi: \mathbb{R} \times \mathbb{R} \to \mathbb{R}$. (Each light ray is also mapped to SLM 211, as discussed below). Here a two-plane parameterization of the light field is used, where x is the spatial coordinate on the screen and v=tan(θ) is the point of intersection with a relative plane at unit distance (see FIG. 2A).

The light field projector 201 emits a light field. The light field is produced by two programmable, light-attenuating SLMs 209, 211 inside the projector. As shown in FIG. 2A, a single light ray maps to two pixels, one pixel in SLM 209 and one pixel in SLM 211.

This invention is not limited to a light field projector that uses two dynamically programmable SLMs. For example, the light field projector may create a light field display by using a first SLM that is a fixed array of pinholes and a second SLM that is dynamically programmable. Other examples of ways in which a light field projector may be implemented are discussed below.

In exemplary implementations in which two SLMS 209, 211 are used, image formation is given by the multiplication of the patterns g and h shown on the two SLMs:

$$\tilde{l}(x,v) = g(\phi(x,v))h(\psi(x,v))  \quad \text{Eq. 2}$$

where $\tilde{l}$ is the image. Similar to $\phi$ for g, $\psi: \mathbb{R} \times \mathbb{R} \to \mathbb{R}$ maps each ray in the light field to a position on the second SLM h. Using ray transfer matrices, these mapping functions can be derived as:

$$\begin{pmatrix} \phi(x,v) \\ \zeta \end{pmatrix} = \begin{pmatrix} 1 & d_g \\ 0 & 1 \end{pmatrix}\begin{pmatrix} 1 & 0 \\ -1/f_p & 1 \end{pmatrix}\begin{pmatrix} 1 & d \\ 0 & 1 \end{pmatrix} T_s \begin{pmatrix} x \\ v \end{pmatrix} \quad \text{Eq. 3}$$

where d is the distance between screen and aperture, $T_s$ is the ray transfer matrix of the screen, $f_p$ is the focal length of the projection lens, and $d_g$ is the distance from the aperture to SLM 209.

The incident ray angle ζ is disregarded in the following analysis; ψ is similar to φ but replaces $d_g$ by $d_h$. See FIG. 2A. While Equation 3 models the ray transfer under the assumption of perfect optics, aberrations can be incorporated into φ as well, as discussed below.

In the absence of an angle-expanding screen, a light field projector would emit a light field with have a narrow angular range that varies only over the aperture of the device. Unfortunately, this limited range is insufficient for an observer to freely move and enjoy glasses-free 3D display within a reasonable field of view.

The angle-expanding screen 203 solves this problem, because it not only preserves angular variation but expands it.

In exemplary implementations of this invention, a screen comprises an array of miniature angle-expanding optical elements, one for each screen pixel. This design is illustrated in FIGS. 2A, 2B and 2C. Whereas the spatial extent of a beam incident from the right is reduced, its incident angle is amplified on the observer side of screen. The ray transfer matrix T of such an angle expander can be modeled as $$T = \begin{pmatrix} 1 & 0 \\ -1/f_s^{(p)} & 1 \end{pmatrix}\begin{pmatrix} 1 & f_s^{(p)} \\ 0 & 1 \end{pmatrix}\begin{pmatrix} 1 & f_s^{(o)} \\ 0 & 1 \end{pmatrix}\begin{pmatrix} 1 & 0 \\ -1/f_s^{(o)} & 1 \end{pmatrix} \quad \text{Eq. 4}$$

where $f_s^{(o)}$ and $f_s^{(p)}$ are the focal lengths of screen lenslets facing the observer and the projector, respectively. As illustrated in FIG. 2B, a simple design of the screen uses two lenslet arrays with the same lens pitch but different focal lengths. Mounted back to back and with a lens size corresponding to the pixel size on the screen, $T_s$ becomes $$T_s = \begin{pmatrix} 1 & 0 \\ 0 & -f_s^{(o)}/f_s^{(p)} \end{pmatrix} \quad \text{Eq. 5}$$

Note that the dependence on ray position in a single angle-expander vanishes for the entire screen in Equation 5, because each lenslet has the same size as a projected image pixel. The refractive effect of the screen only depends on the incident ray angle (i.e., $v_p = -f_s^{(o)}/f_s^{(p)} v_o$), which is flipped and amplified by an angle-expansion factor of $M = f_s^{(p)}/f_s^{(o)}$. Although the screen is limited by diffraction, this effect is negligible in the system because pixels on projection screens are usually large (millimeters as opposed to microns).

In exemplary implementations of this invention, one or more computer processors perform light field factorization algorithms in order to optimize both resolution and image brightness. Image formation (Eq. 2) is discretized as $$\tilde{l} = (\Phi g) \circ (\Psi h) \quad \text{Eq. 6}$$

where $\Phi \in \mathbb{R}^{L \times N}$ and $\Psi \in \mathbb{R}^{L \times M}$ are matrices that permute the rows of the discrete SLM patterns $g \in \mathbb{R}^N$ and $h \in \mathbb{R}^M$ according to the mapping in φ(x,v) and ψ(x,v), respectively, and ∘ is the Hadamard or element-wise product. In this notation, the emitted light field is represented as a discrete vector $\tilde{l} \in \mathbb{R}^L$. The matrices φ and Ψ are sparse (e.g., one non-zero value per row). For example, the matrices Φ and Ψ can be computed by using raytracing or by using calibration that accounts for optical aberrations in practice.

Equation 6 makes clear that the emitted light field is the product of two permuted vectors, hence rank-1. High-speed SLMs in the light field projector operate at refresh rates beyond the critical flicker frequency of the human visual system. Images displayed at such refresh rates are perceptually averaged. A high-speed SLM in the light field projector produces a perceived light field $\bar{l}$, which can be modeled as:

$$\bar{l} = \frac{1}{T}\sum_{t=1}^{T}(\Phi g_t) \circ (\Psi h_t) \quad \text{Eq. 7}$$

where T is the number of pairs of displayed patterns. Here, T pairs of displayed patterns are averaged by the visual system and create a perceived rank-T light field $\bar{l}$. The temporally-changing patterns on the SLMs at time t are $g_t$ and $h_t$. Given a target light field $l \in \mathbb{R}^L$ an optimization problem can be formulated to find the best set—in a least-squared error sense—of time-varying patterns as $$\underset{\{g,h\}}{\text{minimize}} \left\| \beta l - \sum_{t=1}^{T} (\Phi g_t) \circ (\Psi h_t) \right\|_2^2 \qquad \text{Eq. 8}$$

$$\text{subject to } 0 \le g_{ik}, h_{jk} \le 1, \forall i, j, k$$

where i, j, k are positive integers. β is tunable to select between a brighter image and an image that is truer to the original scene. β absorbs the factor 1/T as well as a user-defined brightness boost. The nonnegativity constraints ensure that optimized patterns are physically feasible. Although this is a nonlinear and nonconvex problem, it is biconvex in g and h; fixing one results in a convex problem for updating the other. Such updates are usually performed in an alternating and iterative manner.

In exemplary implementations of this invention, the following multiplicative matrix update rules can be used:

$$g_t \leftarrow g_t \circ \frac{\Phi^T(\beta l \circ (\Psi h_t))}{\Phi^T(\tilde{l} \circ (\Psi h_t)) + \varepsilon} \qquad \text{Eq. 9}$$

$$h_t \leftarrow h_t \circ \frac{\Psi^T(\beta l \circ (\Phi g_t))}{\Psi^T(\tilde{l} \circ (\Phi g_t)) + \varepsilon}$$

where ° and -, respectively, denote element-wise product and division, ε is a small value that prevents division by zero, and $\tilde{l}$ is computed via Equation 7.

The above mathematical formulation allows for extremely efficient implementations, which can be hardware-accelerated on the GPU and can be implemented in real-time. Φ and Ψ can be implemented as a multiview rendering step whereas $\Phi^T$ and $\Psi^T$ correspond to projective texture mapping.

The following is a description of a prototype of this invention:

In this prototype, a projector emits a 4D light field with a narrow field of view that only varies over the projection lens. This angular range is expanded by a screen for an observer on the other side. The screen is composed of passive pixels that each expand the angles of all incident light, similar to a Keplerian telescope. No special calibration with respect to the projector is used beyond focusing the latter on the screen. The projector emits a 4D light field, which is synthesized by two reflective spatial light modulators. Their contribution is optically combined by a 1:1 relay lens. The light source (10 W light emitting diode) is synchronized to the refresh rate (240 Hz) of the spatial light modulators (SLMs) by a circuit board. The SLMs are connected to a standard graphics card via a driver board.

In this prototype, the projector includes two spatial light modulators (SLMs). These two SLMs are at different distances behind a projection lens to create angular variation across the lens aperture. As is apparent in FIG. 2A, the field of view of the system will be maximized by choosing a projection lens with a large aperture relative to its focal length or, similarly, a small f-number. For a fixed screen distance, the image size will be maximized with a shorter focal length lens. In this prototype, a Nikon® Nikkor® 35 mm f/1.4 AI-s lens is used for the projection lens.

In this prototype, the SLMs are reflection mode Liquid Crystal on Silicon (LCoS) modulators (Silicon Micro Display™ ST1080). To achieve an optical path equivalent to that of FIG. 2A with reflective modulators, two polarizing beam-splitter cubes are employed. The physical extent of the beam-splitter cubes requires an additional 1:1 relay lens to optically place both SLMs close to each other. Preferably, the f-number of the relay lens match that of the projection lens. The compound relay lens comprises two Canon® EF 50 mm f/1.8 II lenses mounted face to face. Although this compound relay lens limits the f-number of the system, it provides high image quality and minimizes optical aberrations. The ST1080 modulator operates at 240 Hz and is driven by a driver board. Assuming a critical flicker fusion rate of about 40 Hz for the human visual system, which is reasonable for low-light conditions, the available refresh rates allow a rank-6 monochrome light field decomposition.

Preferably, the illumination unit in the projector: (a) matches the f-number of the system; (b) is uniform over its spatio-angular extent; and (c) is synchronized with the frame updates of the SLMs (i.e., in this case, the illumination source is switchable at 240 Hz). These constraints can be met with a high-powered LED.

In this prototype, the illumination in the projector comprises a 10 W LED mounted on a heat sink behind a mirrored light pipe. The light pipe is taken out of a conventional projector and acts as a "kaleidoscope", virtually cloning the LED to a larger illumination range. The LED is positioned such that the LED image is out-of-focus with the SLM planes, the screen, and the viewer location. Additional lenses are used to form a converging beam on the rear SLM. A custom circuit board employs a microcontroller and a power field-effect transistor to switch the LED in sync with the frame updates of the SLM.

In this prototype, the screen is a horizontal-only angle-expanding screen with an expansion power of M=3. To support a range of vertical viewpoints, a vertical-only diffuser is added. The diffuser comprises a horizontally oriented 100 lpi 31° Lenstar Plus® 3D lenticular. Alternatively, holographic uni-directional diffusers can be used.

Unlike typical lenticular displays, the screen does not decrease the resolution of the projected image. Preferably, each lenticular has the size of a projected pixel on the screen. To maximize image resolution, the physical size of a lenticular is matched to the size of an SLM pixel after magnification through the projector optics. In this prototype, the projection lens is located 50 cm away from the screen and produces an image with a size of 21.3×11.7 cm. The lenticular pitch of the screen is 0.5 mm, which limits the achieved image resolution in the prototype to 426×720 pixels. Alternately, a larger image size or smaller lenticulars can be used, to increase this resolution.

In this prototype, the screen lenticulars have the same pitch. However, to achieve a viewing zone at a distance from the screen greater than that of the projector, the pitch can be adjusted such that the screen acts as an angle-expander and simultaneously as a lens focusing illumination into the viewing zone. In this prototype, a similar effect is achieved with an additional fresnel lens mounted close to the screen on the projector side. Alternately, the entire screen optics can equivalently be fabricated as a single, large-scale sheet in a roll-to-roll process.

In this prototype, components are calibrated. The prototype is built on optical rail system and is calibrated with bar and checkerboard patterns.

In this prototype, the front-focused image cannot be focused as sharply as the rear-focused image due to optical aberrations in the angle-expanding screen. The point spread function (PSF) of the angle-expanding screen is characterized by displaying a point on the rear SLM and taking a RAW photograph with subtracted blacklevel. The recorded PSF is approximated as a 2D Gaussian and incorporated into the light field factorization. The intensity transfer function of the SLMs are also characterized. These intensity transfer functions are not well approximated by a standard Gamma curve. For this purpose, RAW photos of the screen are taken from the center of the viewing zone while the prototype displays a sequence of different intensities over the input range of the SLM driver. The inverses of the resulting curves are applied to the factorizations computed by the solver.

In this prototype, target light fields are rendered using POV-Ray, but any graphics engine can be used alternatively. Nonnegative light field factorization routines (Eq. 9) are implemented on the GPU (graphics processing unit) using OpenGL and Cg. Decomposing a light field with eight horizontal views and an image resolution of 1280×720 pixels takes about one minute on an Intel® Core™ i7-2600 PC with an Nvidia GeForce® GTX 690 GPU. Including convolution operations with the point spread function to model screen aberrations increases processing times by a factor of 10-20×, depending on the PSF (point spread function) size. The finite blacklevel of each SLM is taken into consideration by clamping the values of g and h to the feasible range after each iteration (see Eq. 9).

Figure 3D:
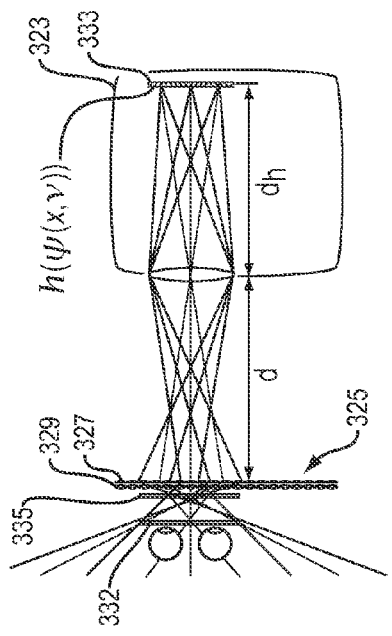
FIGS. 3A, 3B, 3C, 3D, 3E, and 3F show ray paths for in-focus and out-of-focus SLMs through an angle-expanding screen.
Figure 3E:
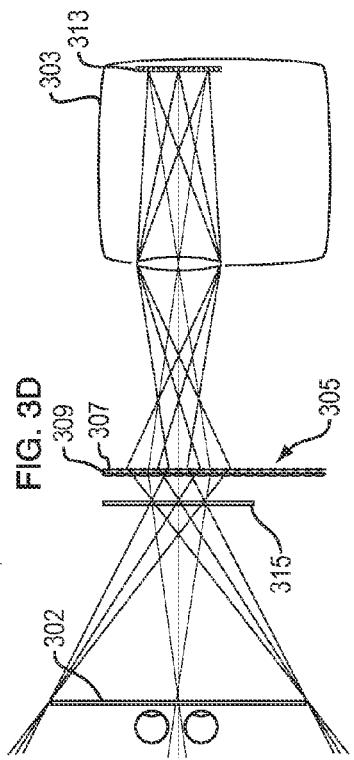
Figure 3F:
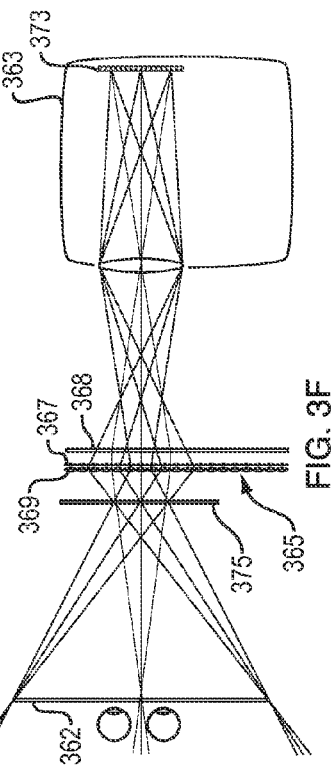
Figure 3A:
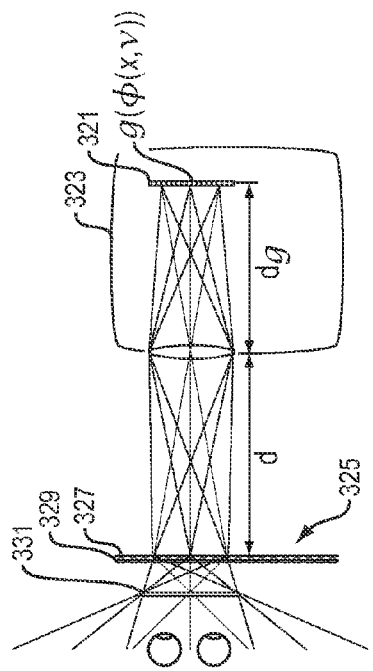
Figure 3B:
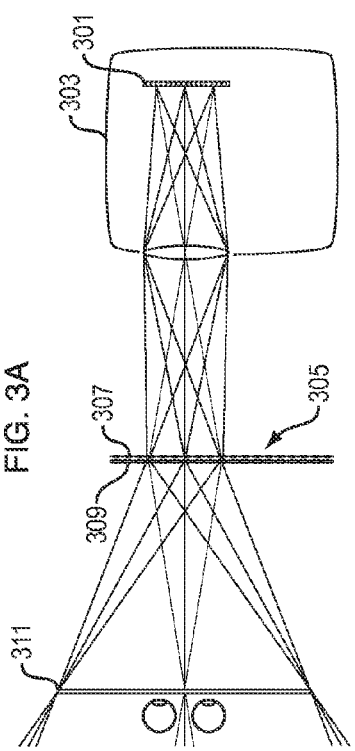
Figure 3C:
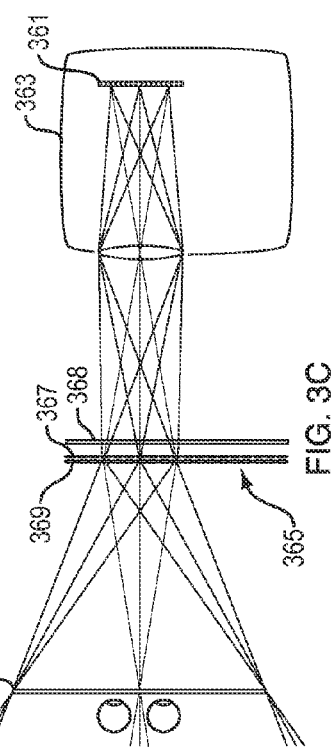

In this prototype, the lenticules are evenly pitched. This would, unless mitigated, cause the viewing zone to be too close to the screen. To solve this problem, in this prototype, a fresnel lens is placed on the projector side of the screen, as shown in FIGS. 3C and 3F.

This invention is not limited to the above-described prototype. Instead, this invention can be implemented in many different ways.

FIGS. 3A, 3B, 3C, 3D, 3E, and 3F show ray paths for in-focus and out-of-focus SLMs through an angle-expanding screen. In these Figures, the projector lens of a light field projector (303, 323 or 363) produces a focused image of a first, in-focus SLM g (301, 321, or 361) on the angle-expanding screen (305, 325 or 365). A second SLM h (313, 333, or 373) is out-of-focus. The angle-expanding screen (305, 325 or 365) comprises two sheets, where each sheet comprises an array of lenslets (a "lenslet sheet").

Preferably, the angle-expanding screen is a super-lens: angles are not only expanded by lenslets with different focal lengths but also focused though a different pitch of the two lenslet sheets. FIGS. 3B and 3E show an example of such a configuration. In FIGS. 3B and 3E, a screen 305 comprises two lenslet sheets (307, 309) that are unevenly pitched (i.e., the lenslets in sheet 307 have a different length than the lenslets in sheet 309). This causes the viewing zone (311 or 302) to be at a desirable distance from the screen 305.

In contrast, if the lenslet sheets are evenly pitched, this causes the viewing zone to be too close to the screen. FIGS. 3A and 3D show a screen 325 comprising two lenslet sheets (327, 329) that are evenly pitched (i.e., the lenslets in sheet 327 have the same length as the lenslets in sheet 329). In FIGS. 3A and 3D, these evenly pitched lenslets shift the viewing zone (331 or 332) too close to the screen.

A fresnel lens can be added to a screen with evenly pitched lenslets, to compensate for this effect. FIGS. 3C and 3F also show a screen 365 comprising two lenslet sheets (367, 369) that are evenly pitched (i.e., the lenslets in sheet 367 have the same length as the lenslets in sheet 369). However, a fresnel lens 368 is added to compensate. The fresnel lens 368 shifts the viewing zone (371 or 362) to a desirable distance, but introduces slight image distortions.

Optical paths of light rays from the first, in-focus SLM g (301, 321, or 361) are shown in FIGS. 3A, 3B and 3C. The in-focus SLM g is focused on the screen. Angular variation for the illumination cones of each pixel are expanded by the screen.

The optical paths of light rays from a second SLM h (313, 333, or 373) are shown in FIGS. 3D, 3E and 3F. An image is created in mid-air in front of the screen and re-imaged to the viewer side. The illumination paths intersect those of the in-focus SLM on the viewer plane, which means the observer can freely move inside the viewing cone and see both images. The two SLM images are created with a distance in between them and they interact in a multiplicative fashion.

In FIG. 3D (with evenly pitched lenslets and no fresnel lens), the conjugate plane 335 (i.e., the plane that is conjugate to SLM h 333) is too close to the screen 325. In FIG. 3E (with unevenly pitched lenslets), the conjugate plane 315 (i.e., the plane that is conjugate to SLM h 313) is at a desirable distance from the screen 305. Likewise, in FIG. 3F (with evenly pitched lenslets and a fresnel lens), the conjugate plane 375 (i.e., the plane that is conjugate to SLM h 373) is at a desirable distance from the screen 365.

Alternatively, in FIGS. 3A, 3B, 3C, 3D, 3D and 3F, each sheet comprising a 2D array of lenslets can be replaced with a sheet comprising a 1D array of lenticular lenses.

Alternatively, other types of SLMs (instead of LCoS SLMs) may be used. For example, the SLMs may comprise high speed micromirror SLMs, which could reduce light loss and increase refresh rates.

In some implementations of this invention, one or more computer processors execute algorithms in which matrix-vector multiplications with $\Phi$, $\Psi$, and their transposes are implemented in a matrix-free fashion using multiview rendering and projective texture mapping.

Here is a non-limiting example of pseudocode for an algorithm that the one or more processors may use. The algorithm comprises an Open GL implementation of multiplicative update rules:

---
Algorithm 1 Open GL implementation
of multiplicative update rules

---
init $g_t$ = rand(0,1), $h_t$ = rand(0,1), for t = 1 ... T
for each iteration i
  $\tilde{l} \leftarrow$ renderLightField($g_{1...T}$, $h_{1...T}$)
  for each frame t
    $\tilde{l} \leftarrow$ renderLightField($h_t$)
    $g_t \leftarrow g_t \circ$ projectiveTextureMap($\beta l \circ \tilde{l}$, g)/(projectiveTextureMap($\tilde{l} \circ \tilde{l}$, g)+$\in$)
  end
  $\tilde{l} \leftarrow$ renderLightField($g_{1...T}$, $h_{1...T}$)
  for each frame t
    $\tilde{l} \leftarrow$ renderLightField($g_t$)
    $h_t \leftarrow h_t \circ$ projectiveTextureMap($\beta l \circ \tilde{l}$, h)/(projectiveTextureMap($\tilde{l} \circ \tilde{l}$, h) $\in$)
  end
end

---

In this algorithm, the function renderLightField($g_{1...T}$, $h_{1...T}$) renders a multiview light field of all layers and time frames, implementing $$\tilde{l} = \frac{1}{T}\sum_{t=1}^{T}(\Phi g_t) \circ (\Psi h_t).$$

The function renderLightField($h_t$) also renders a light field from the same perspective but only draws one of the layers at frame t.

The function projectiveTextureMap(βl°Ĩ, g) performs projective texture mapping of multiple images from the perspectives of the light field cameras onto a geometric representation of g, implementing $\Phi^T$ (βl∘Ĩ). Similarly, projectiveTextureMap(βl°Ĩ,h) implements $\Psi^T$ (βl∘Ĩ)

In some implementations of this invention, the angle-expanding screen is a horizontal-parallax only screen.

Figure 4A:
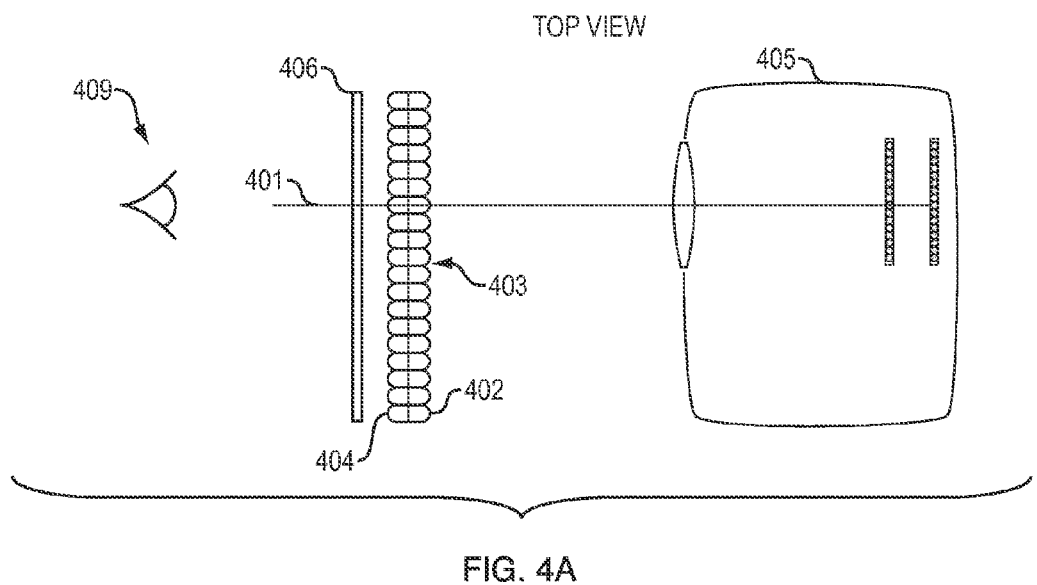
FIGS. 4A and 4B are a top view and side view, respectively, of a light ray passing through a horizontal-only parallax screen with a vertical diffuser.
Figure 4B:
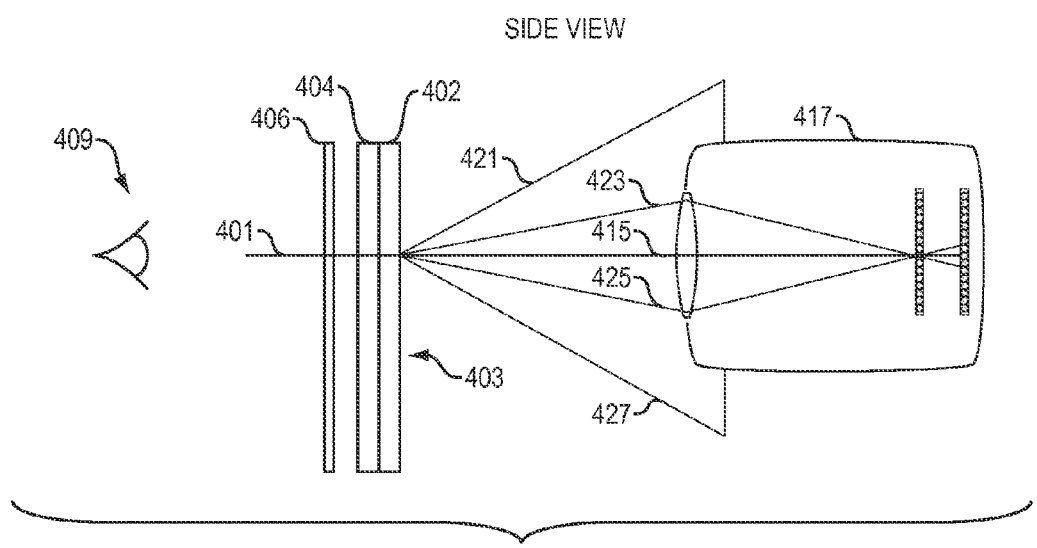

FIGS. 4A and 4B are a top view and side view, respectively, of ideal optical path(s) of light passing through a horizontal-only parallax screen with a vertical diffuser. When seen from above (FIG. 4A, top view), a light ray 401 from an observer would travel along a straight line through the screen 403, and intersect each SLM in the light field projector 405 at exactly one pixel. The effect of the vertical diffuser 416 cannot be seen in this top view. When seen from the side (FIG. 4B, side view), the vertical diffuser 416 in the screen 403 would spread the light ray out in the vertical dimension (e.g., into rays 415, 421, 423, 425, 427) eliminating possible vertical parallax but allowing the observer to freely move his head up and down.

In both FIGS. 4A and 4B, the angle-expanding screen comprises two lenticular sheets 402, 404. Preferably, the vertical-only diffuser 406 is located on the observer 409 side of the screen. (This is done, in case the vertical-only diffuser has some small horizontal effect.) Alternately, the vertical-only diffuser can be anywhere else in the optical stack.

FIGS. 4A and 4B show an ideal case. In a prototype, however, aberrations (including scattering, interreflections, and other non-ideal effects) are observed, in addition to the vertical blur. These aberrations can be partially compensated for by the following procedure: Activate a single pixel on a first SLM, capture its point spread function at the location of the image of the first SLM after projector and screen optics. Then activate a single pixel on the second SLM and capture its point spread function at the location of the image of the second SLM after the projector and screen optics. Use the captured point spread functions in the factorization. This procedure captures the point spread functions of a single pixel on the two SLMs, models the aberrations as convolutions with those PSFs, and incorporates them into the factorization algorithm. Therefore, the factorization algorithm not only can achieve light efficient image synthesis, but also can partially correct for aberrations. It can also partially correct for limited dynamic range of the SLMs.

In some implementations of this invention, the following update rules for light field synthesis with aberrations can be used:

$$g_t \leftarrow g_t \circ \frac{\overline{\Phi}^T(\beta l \circ (\overline{\Psi} h_t))}{\overline{\Phi}^T(\tilde{l} \circ (\overline{\Psi} h_t)) + \varepsilon}$$ Eq. 10

$$h_t \leftarrow h_t \circ \frac{\overline{\Psi}^T(\beta l \circ (\overline{\Phi} g_t))}{\overline{\Psi}^T(\tilde{l} \circ (\overline{\Phi} g_t)) + \varepsilon}$$

where $\overline{\Phi} = \Phi \Phi_{blur}$ and $\overline{\Psi} = \Psi \Psi_{blur}$. The matrices $\Phi_{blur}$ and $\Psi_{blur}$ encode a convolution with the measured point spread functions. In the OpenGL solver (Algorithm 1), this can be implemented as a matrix-free blur operation using a Cg shader.

This invention may be implemented with many different screen and projector configurations. For example: (a) horizontal-only parallax can be achieved with a single light field projector using 1D lenticular screens; (b) full parallax can be achieved with a single light field projector with 2D lenslet screens; and (c) wider fields of view and higher-rank light field decompositions can be achieved with multiple light field projectors.

FIG. 5A shows a single light field projector 501 with coded aperture 503. The coded aperture can be 1D or 2D.

FIG. 5B shows a 1D coded aperture, with variation along only one dimension 505.

FIG. 5C shows a 2D coded aperture, with variation along two dimensions 511, 513.

FIG. 5D shows a system comprising an array of multiple light field projectors (e.g., 531, 533, 535).

Figure 6A:
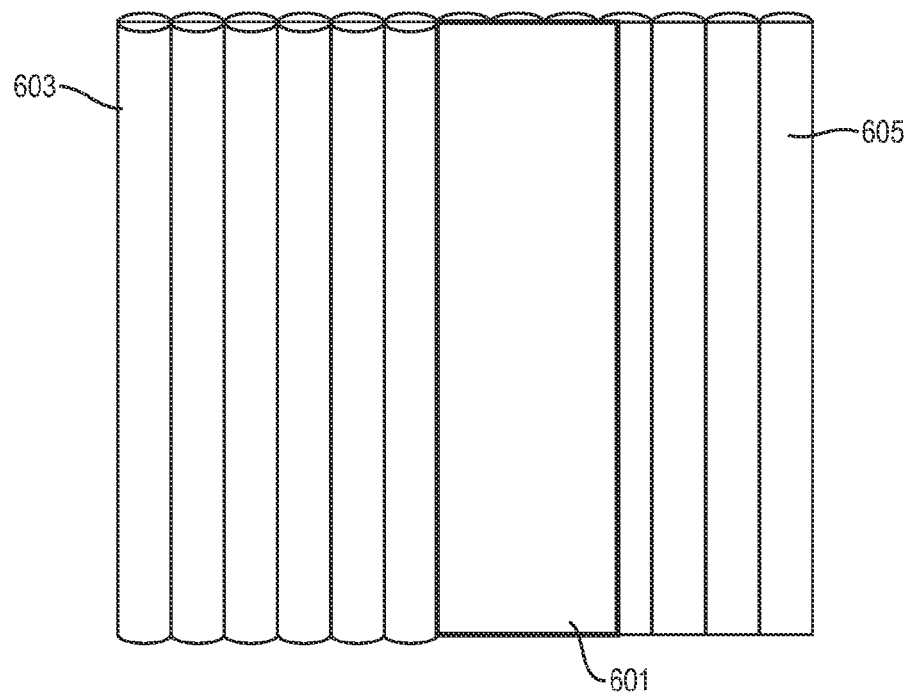
FIG. 6A shows 1D lenticulars in a horizontal-only parallax screen.

FIG. 6A shows 1D lenticulars in a horizontal-only parallax screen. In the example shown in FIG. 6A: a vertical diffuser 601 is positioned between a first array of vertically-oriented lenticules 603 and a second array of vertically oriented lenticules 605. Alternately, the vertical diffuser may be placed elsewhere in the optical stack (e.g., proximate to the screen, on the observer side of the screen).

Figure 6B:
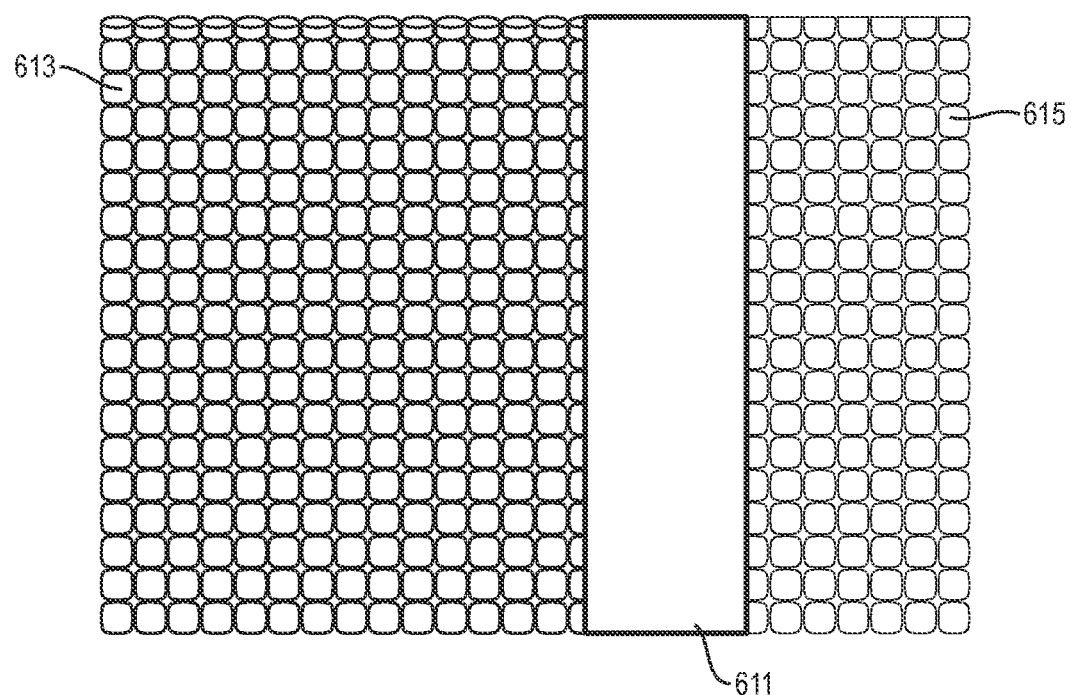
FIG. 6B shows 2D lenslets in a full parallax screen.

FIG. 6B shows 2D lenslets, in a full parallax screen. In the example shown in FIG. 6B: additional optical films 611 can be positioned between a first array of lenslets 613 and a second array of lenslets 615, in order to tune additional optical properties, such as path length, polarization, or aberrations.

In the examples shown in FIGS. 6A and 6B, the mid-planes of the arrays of lenslets or lenticulars are separated by a distance equal to the sum of their focal lengths. (See also, FIGS. 2B and 2C).

This invention is not limited to single device configurations; multi-device setups can be used instead. For instance, multiple light field projectors can be mounted in a horizontal array to extend the horizontal field of view of the system. A 2D array of projectors (see, e.g., FIG. 5D) can increase the field of view both horizontally and vertically for a full parallax projection system. If a 2D array of light field projectors is used, then, for example: (a) the devices can be positioned adjacent to each other; or (b) periodic viewing zones of the lenslet-based screen can be exploited to place the projection devices at a larger physical distance but precisely located within different angular periods of the screen.

Alternately, a lenticular-based horizontal-only parallax screen can be used with vertically stacked projectors. In that case, a vertical diffuser in the screen optically combines (i.e. sums) their contribution, effectively increasing image brightness and also the achievable rank of the synthesized light field. The vertical summation caused by the diffuser is mathematically equivalent to increasing the speed of the SLMs in a single device. Therefore, multiple vertical projectors in such a setup can increase the rank of the system by a factor corresponding to the number of devices. In such a configuration, not only can rank be increased, but also color and luminance projection can be decoupled, allowing for high-rank luminance and lower-rank chrominance light field display. Advantageously, a light field display with high-rank luminance and low-rank chrominance is well suited for viewing by the human visual system. (The human visual system is much more sensitive to depth cues in luminance than in chrominance).

In exemplary implementations of this invention, multiple light field projectors and an angle-expanding screen with 2D lenslets can, together, produce a display with full parallax (i.e., both horizontal and vertical parallax). For this purpose, a regular grid of projectors can be mounted such that their apertures are densely spaced. Lenslets produce periodic viewing zones; this fact can be exploited by spacing projectors further apart yet at the virtual position of the dense setup in the periodic viewing zones. In some cases, the screen lenslets are fabricated with astigmatism (i.e., with different focal lengths for the horizontal and vertical dimensions). Advantageously, multi-device full parallax systems are flexible and create extended viewing zones or fields of view.

As with single-device setups, a "screen sandwich" of semicylindrical lenticulars and a vertical-only diffuser can be used for horizontal-only parallax configurations. Placing multiple projectors next to each other allows for extended fields of view, whereas stacking them vertically overlays their contributions and facilitates higher-rank light field synthesis. The image formation for D vertically stacked devices, each with a 1D aperture SLM, is $$\tilde{l} = \frac{1}{T} \sum_{t=1}^{T} \sum_{d=1}^{D} \left( \Phi^{(d)} g_t^{(d)} \right) \circ \left( \Psi^{(d)} h_t^{(d)} \right) \quad \text{Eq. 11}$$

where $\Phi^{(d)}$ and $\Psi^{(d)}$ map the SLM images of device d to the emitted light field. Straightforward modifications of the multiplicative update rules can be employed to compute the light field decompositions for all devices.

The combined formulation for a horizontal-only parallax screen with multiple vertically-arranged projectors is:

$$g_t^{(d)} \leftarrow g_t^{(d)} \circ \frac{\Phi^{(d)T} \left( \beta l \circ \left( \Psi h_t^{(d)} \right) \right)}{\Phi^{(d)T} \left( \tilde{l} \circ \left( \Psi h_t^{(d)} \right) \right) + \epsilon} \quad \text{Eq. 12}$$

$$h_t^{(d)} \leftarrow h_t^{(d)} \circ \frac{\Psi^{(d)T} \left( \beta l \circ \left( \Phi g_t^{(d)} \right) \right)}{\Psi^{(d)T} \left( \tilde{l} \circ \left( \Phi g_t^{(d)} \right) \right) + \epsilon}$$

In some cases, adding more devices has the same effect as increasing the speed of SLMs in a single device but with the additional benefit of increased brightness. The compressive display architecture allows for a direct tradeoff between speed of employed SLMs and number of devices.

Figure 7:
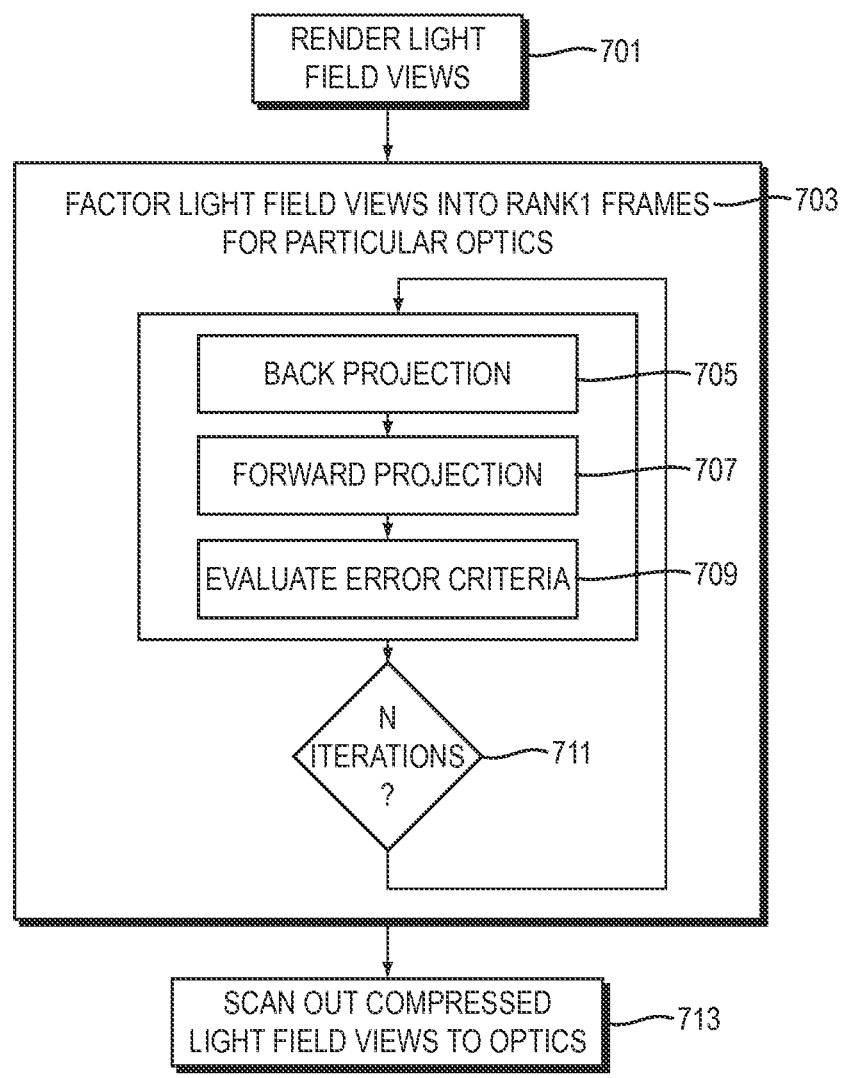
FIG. 7 is a high level flowchart for a method of compressive light field projection.

FIG. 7 is a high level flowchart for a method of compressive light field projection. In the example shown in FIG. 7, the method comprises the steps of: (1) rendering light field views 701; (2) factoring light field views into Rank 1 frames for particular optics 703 (this factoring includes n iterations of back projection 705, forward projection 707, evaluation of error criteria 709, and counting the number of iterations 711); and (3) scanning out compressed light field views to optics 713.

Figure 8:
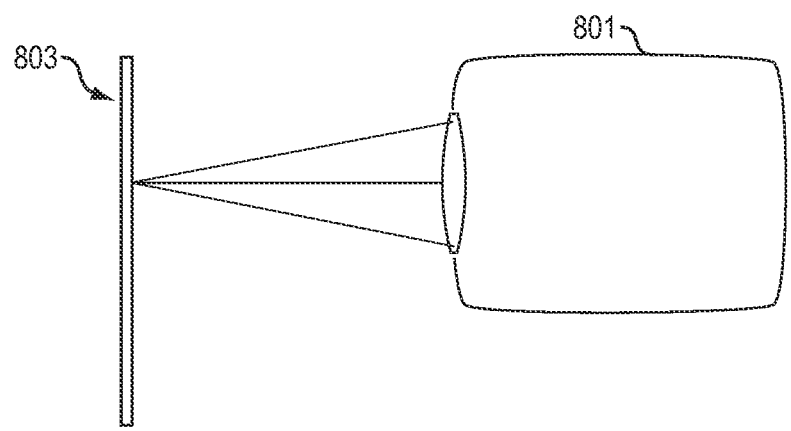
FIG. 8 is a high-level diagram of a projection system that comprises a light field projector and an angle-expanding screen.

FIG. 8 is a high-level diagram of a projection system that comprises a light field projector 801 and an angle-expanding screen 803.

In exemplary implementations of this invention, an angle-expanding screen (e.g., 803) can be implemented in many different ways.

For example, an angle-expanding screen can be implemented as any tiled arrangement of two or more lenses back to back can be used to implement a rear-projection angle expanding screen. If the lenses are 1D (lenticular), the screen will expand angles only along one dimension. If the lenses are 2D (lens array), the screen will expand angles along two dimensions.

Or, for example, a reflective version of an angle-expanding screen can be used, in which a light ray takes at least two bounces within the screen. Or, for example, an angle-expanding screen may comprise a catadiotropic optical system comprising a refractive surface and a reflective surface.

Or, for example, either reflective or transmissive versions of the angle-expanding screen could be created using arrays of tiny holographic optical elements (HOE) or hogels rather than refractive or reflective elements.

In exemplary implementations of this invention, a light field projector (e.g., 801) can be implemented in many ways. For example, a light field projector can be implemented as: (1) a system with two or more transmissive modulating layers behind a projection lens; (2) an optically equivalent system to 1 where the modulating layers are reflective, and surrounded by appropriately placed beam splitters; (3) a "coded aperture" system with one transparent modulator in the aperture plane of the projection lens and one at the image plane; (4) an equivalent system to 3 where the modulators are reflective and surrounded by appropriately placed beam splitters; (5) any spatial light modulator placed behind a lenticular (1D or 2D) in the focal plane of the main projection lens; (6) a combination of 1, 2 and 5 (e.g., a tensor display architecture); (7) volumetric displays (such as a spinning disk or stack of light emissive layers such as OLEDs) placed behind a main projection screen; (8) directional backlight displays behind a main projection lens; (9) a holographic display behind a main lens; or (1) any other light field display technology adapted for placement behind a projection lens.

In exemplary implementations of this invention, a glasses-free 3D projection system does not require mechanical movement of screen elements. The projection system includes active, factored light field projection and a passive, angle-expanding screen. The projection system can be implemented with one or more light field projectors. The projection system can produce large-scale displays, such as for movie theaters.

In exemplary implementations, one advantage of the projection system is that it creates a compressive light field display, in both an optical and computational sense. The screen achieves optical compression by expanding the angular range of the light field from the projector to an observer. (Or, equivalently, the screen compresses the observed light field into the projector lens.) The projection system also employs computational compression by computing a compressed form of the target light field that is presented to an observer. Limitations in human visual integration speed allow the visual system to act as a decompressor. One or more computer processors in the projection system execute factorization algorithms to compute an optimal compressed light field representation for a given optical system.

In exemplary implementations, another benefit of the projection system is the optical flexibility of the angle-expanding screen. Angle amplification can be varied by altering the ratio of focal lengths within the screen. The optical design space of the screen with respect to these parameters is flexible in that the viewing zone size and location can be scaled independently of the projector-to-screen distance. An angle expanding screen fabricated from lenses with identical pitch and having a power $M = f_s^{(p)}/f_s^{(o)}$, will optically image an object at distance d behind the screen to a distance d/M in front of the screen for small values of d.

In a prototype, a fresnel lens focuses the projector illumination to a viewing zone at an arbitrary distance to the screen. Alternately, the pitch between screen lenticulars (or screen lenslets) can be modified such that the screen directly focuses light to the desired viewing zone while amplifying the angular range.

In some implementations, high-speed spatial light modulators, such as digital micromirror devices (DMDs) or fast transmissive microshutters (e.g., pixtronix.com) are used.

These high-speed SLMs provide refresh rates in the KHz range, and thereby directly increase the observed 2D and 3D quality.

This invention is not limited to a light field projector using a dual-layer design; instead, any type of light field projector may be used.

For example, a second prototype of this invention uses a coded aperture light field projector. To build this prototype, the inventors disassembled a Canon® EF 50 mm f/1.8 lens and mounted a polarizing beam splitter cube and an LCoS display as close to the aperture plane as possible.

Figure 9:
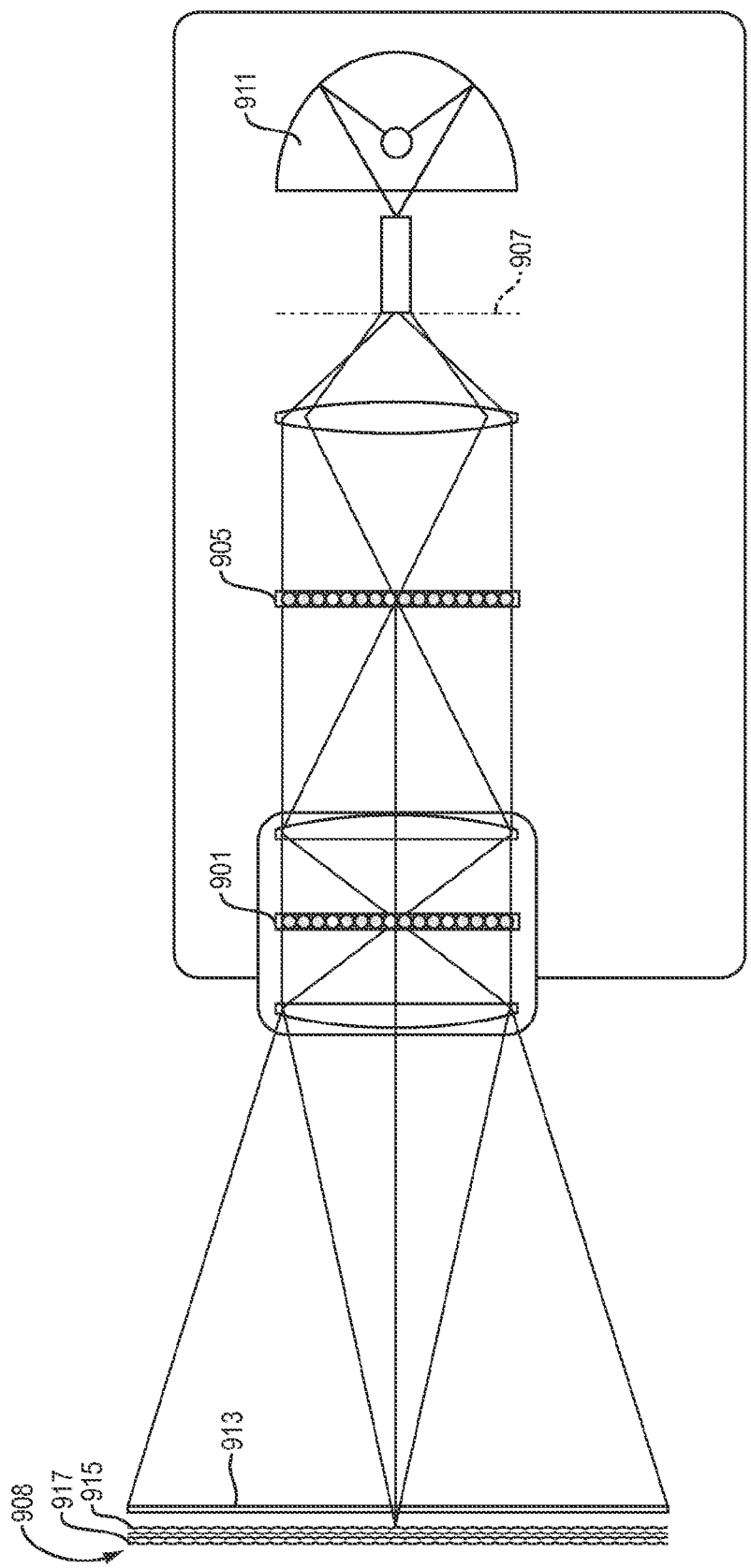
FIGS. 9 and 10 are ray diagrams of examples of projection system using a coded aperture light projector.
Figure 10:
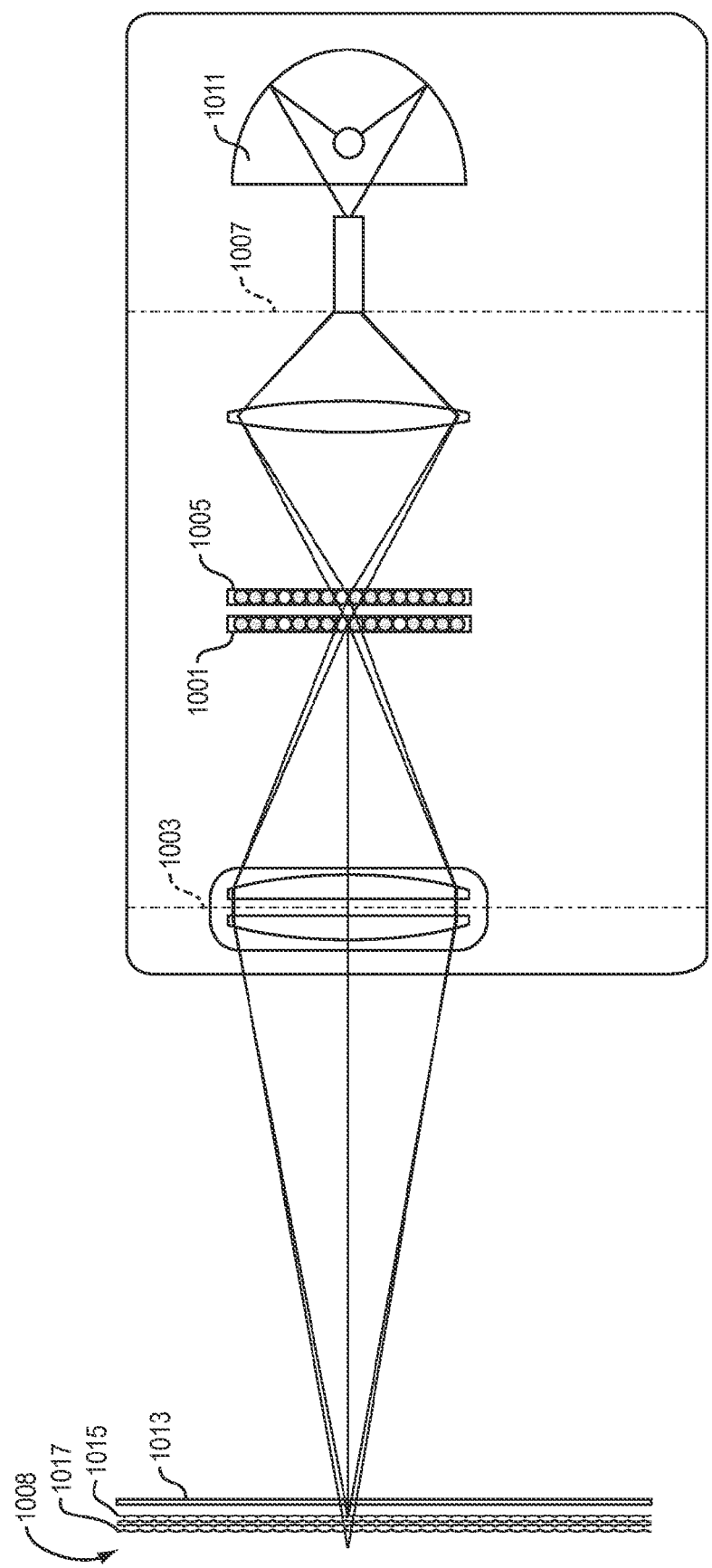

FIGS. 9 and 10 show examples of projection system using a coded aperture light projector. In FIG. 9, an image SLM 905 is conjugate to the angle-expanding screen 908, and an aperture SLM 901 is conjugate to the output 907 of a light engine 911. In FIG. 10, the image SLM 1005 and aperture SLM 1001 are adjacent to each other, and approximately conjugate to both the angle-expanding screen 1008 and the output 1007 of a light engine 1011.

In the example shown in FIG. 9, the angle-expanding screen 908 comprises two sheets of lenslets 915, 917. A fresnel lens 913 is adjacent to the screen 908.

Likewise, in the example shown in FIG. 10, the angle-expanding screen 1008 comprises two sheets of lenslets 1015, 1017, and a fresnel lens 1013 is adjacent to the screen 1008.

In some implementations of this invention, a light field projector projects light onto a conventional diffusing screen, instead of onto an angle-expanding screen. This approach (light field projector with diffusing screen) can simultaneously achieve both super-resolution and high dynamic range projection. This approach can be used with either a rear- or front-projection system.

In some implementations of this invention, a projection system comprising a standard diffusing screen and a light field projector with two low-resolution SLMs produces super-resolved compressive images.

Similar to Equation 2, the image formation of the light field projector illuminating a conventional, diffuse screen can be modeled as $$\tilde{i}(x) = g(\phi_{2D}(x))h(\psi_{2D}(x)) \qquad \text{Eq. 13}$$

where $\tilde{i}(x) = \int \tilde{l}(x,v)dv$ is the observed image and $\phi_{2D}, \psi_{2D}: \mathbb{R} \to \mathbb{R}$ map the image coordinates of $\tilde{i}$ to 2D coordinates on the SLMs.

A single pixel of g or h is likely to affect multiple pixels in $\tilde{i}$, which is due to defocus blur and the fact that a projected image is being created with a higher pixel count than that of either SLM.

The following equation discretizes this formulation, accounts for time-multiplexing over T frames, and incorporates the mapping functions into projection matrices as $$\tilde{i} = \frac{1}{T}\sum_{t=1}^{T}(\Phi_{2D}g_t) \circ (\Psi_{2D}h_t) \qquad \text{Eq. 14}$$

In practice, the projection matrices $\Phi_{2D} \in \mathbb{R}^{S \times N}$ and $\Psi_{2D} \in \mathbb{R}^{S \times M}$ encode a convolution of the SLM images $g_t \in \mathbb{R}^N$ and $h_t \in \mathbb{R}^M$ at time t with Gaussian-type kernels modeling defocus blur and superresolved image formation.

A target image $i \in \mathbb{R}^S$, S>M, N can be approximated by the setup by solving an objective function that closely follows the formulations in Equation 9 but replaces the 4D light field projection matrices with the 2D convolution matrices $\Phi_{2D}$, $\Psi_{2D}$. In practice, all forward and transpose matrix multiplications can be implemented as convolution operations in Matlab® with point spread functions measured on the physical display.

Here is an example of how such a super-resolution display can be created: Two target images with a resolution exceeding that of either SLM are decomposed into three time-multiplexed frames that are displayed on the SLMs at a high speed. For a human viewer, or a camera capturing photographs with exposure times similar to those of the human visual system, the observed image has a higher resolution than that of a conventional projection with a single SLM.

In some implementations, the improvement in resolution cannot exceed a factor of 2×. The highest frequencies displayed on either SLM optically multiply, which is a convolution of Dirac peaks in the Fourier transform. For two SLMs, this convolution shifts the maximum achievable frequency out to twice its original distance. Assume that the maximum image frequencies of the panels, as observed on the screen, are $f_g$ and $f_h$, respectively. Displaying sinusoidal patterns at the maximum frequencies results in the following image:

$$\tilde{i}(x) = \cos(f_g x)\cos(f_h x) \qquad \text{Eq. 15}$$
$$= \frac{1}{2}(\cos((f_g - f_h)x) + \cos((f_g + f_h)x)).$$

Equation 15 ignores positivity constraints of the displayed image. However, it does not change the fact that the maximum observable frequency in the composed image is $f_{max} = f_g + f_h$, allowing for super-resolution by a factor of 2×.

Figure 11:
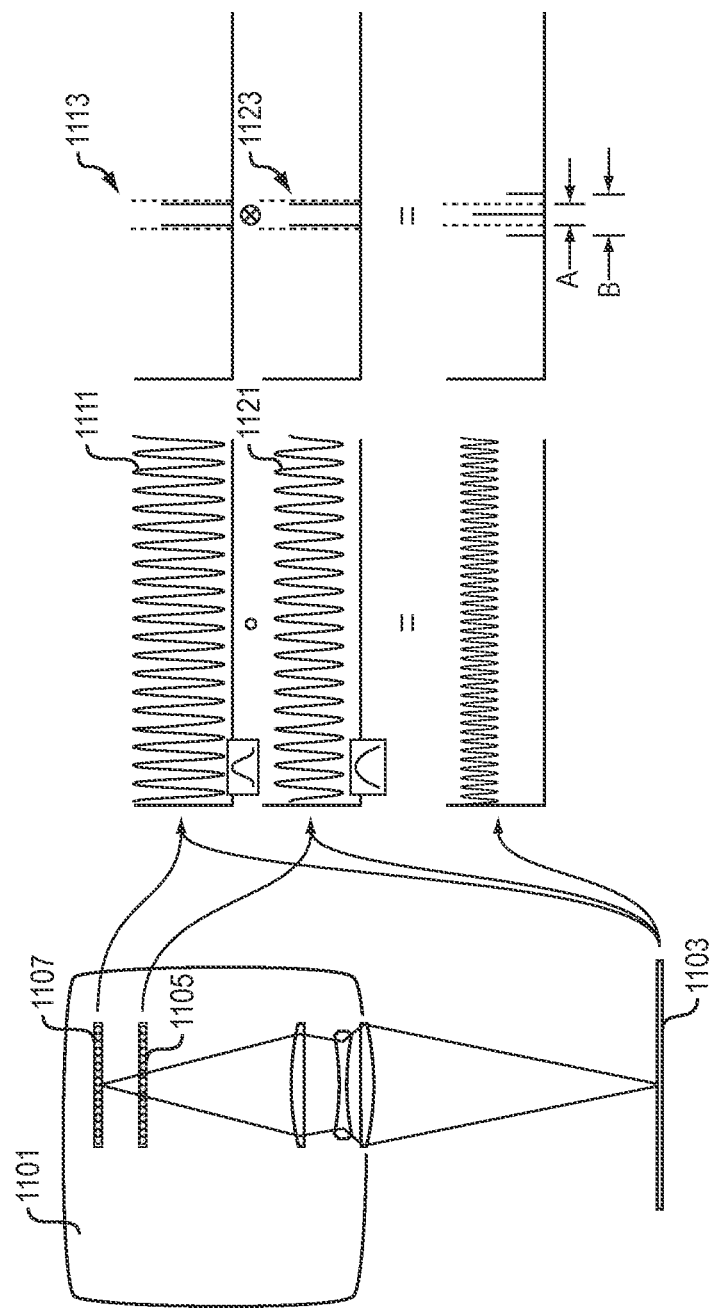
FIG. 11 is a conceptual diagram of compressive super-resolution projection, using a light field projector and a diffuse projection screen.

FIG. 11 is a conceptual diagram of compressive super-resolution projection, using a light field projector and a conventional diffuse screen. In the example shown in FIG. 11: The projector 1101 includes a first SLM 1107 and a second SLM 1105. The maximum image frequencies 1111, 1121 of the first and second SLMs, respectively, are optically multiplied. This multiplication corresponds to a convolution in the frequency domain (i.e., the Fourier transforms 1113, 1123 of the maximum image frequencies are convolved). Although the image of one of the SLMs is out of focus on the screen due to defocus blur, the effective resolution of the display is increased by a factor of 2× compared to a conventional projection system. In FIG. 11, distance A is the spatial bandwidth of a single SLM. Distance B indicates that a higher spatial bandwidth can be achieved by the projection system.

Figure 12:
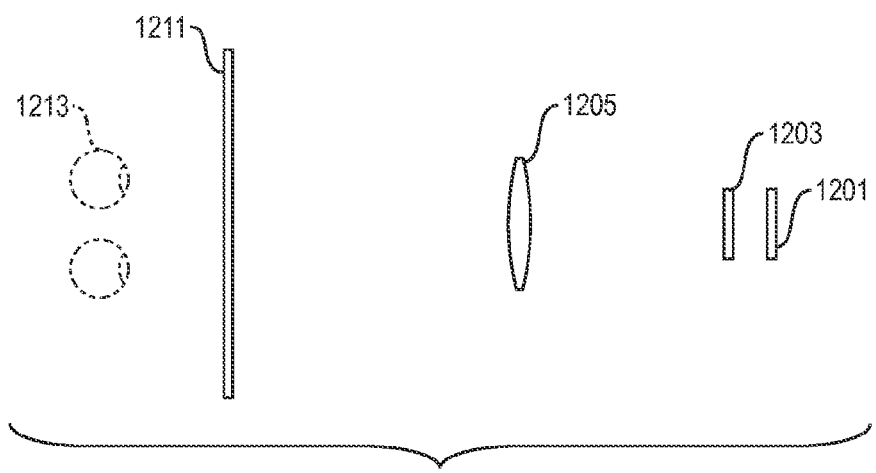
FIG. 12 shows hardware for a projection system comprising a light field projector behind a standard diffuser.

FIG. 12 shows hardware for a projection system comprising a light field projector behind a standard diffuser. In the example shown in FIG. 12: Light from a first SLM 1201 travels through a second SLM 1203, then through a focusing lens 1205, then through a diffusing screen 1211 and then to an observer 1213. The resulting image, as seen by an observer 1213, exhibits both super-resolution and high dynamic range.

In the example shown in FIG. 12, the diffusing screen 1211 is transmissive and the observer 1213 is on the opposite side of the screen from the light field projector (which includes SLMs 1201, 1203). Alternatively, the diffusing screen 1211 is reflective and the observer 1213 is on the same side of the screen as the light field projector. In that alternative case: (a) light from a first SLM 1201 may travel through a second SLM 1203, then through a focusing lens 1205, then to a diffusing screen 1211 and then diffusely reflect from the screen to an observer 1213; and (b) the resulting image, as seen by an observer 1213, may exhibit both super-resolution and high dynamic range.

In the example shown in FIG. 12, the projection system relays and magnifies images of SLMs onto a diffuse screen.

The SLMs 1201, 1203 are much smaller than the diffuse screen 1211. The magnified real image of each modulator is placed proximate to the diffuse screen. One or more computer processor perform a light field analysis to determine an objective function for the optimization routine.

In exemplary implementations of this invention, a super-resolution display is produced as follows: Two or more spatial light modulators produce a distribution of light rays wherein the spatial direction and position of each ray in the collection of rays is controlled computationally. The light rays are focused through a focusing lens onto a diffuse screen. The distribution of rays is chosen by means of a computer optimization routine such that the interaction of light rays arriving from various positions and directions forms a two dimensional image on the diffuse screen with a higher resolution and a higher dynamic range than either of the SLMs.

In some implementations of this invention, a super-resolution display is produced as follows: Two or more spatial light modulators are optically combined behind a focusing lens, such that a first SLM is focused onto a diffuse screen, and a second SLM is defocused slightly from the diffuse screen such that the image of the second SLM formed on the screen is slightly blurred. The distribution of pixel states on each of the SLMs is chosen by means of a computer optimization routine such that the interaction of the images of the multiple modulators on the diffuse screen forms an image on the diffuse screen with a higher resolution and a higher dynamic range than either of the SLMs.

A projection system that comprises a light field projector and a standard diffusing screen (instead of an angle-expanding screen) can produce images that are both super-resolved and have a high dynamic range. For this purpose, one or more computer processors apply the same update rules as described above for super-resolution (e.g., Equation 10) to a target image i that has a higher dynamic range and a higher resolution than either SLM. The one or more computer processors clamp the resulting SLM patterns to the physically-achievable contrast after each iteration. In this approach, the dynamic range of a projected image—in addition to image resolution—can be significantly increased compared to a conventional projection system. In this approach, extended contrast and super-resolution is effectively factored into the objective function of the optimization algorithm. Effectively, the algorithm is configured so that the result of the computation yields a higher dynamic range and higher resolution image. Because the system is functioning in a projection mode, a diffuser is added, so that a human can observe the image.

In the approach described above, the target image i and projected image have both a higher dynamic range and a higher resolution than either SLM. Alternately, the target image i and projected image can have a higher dynamic range (but not a higher resolution) than either SLM. Or, alternately, the target image i and projected image can have a higher resolution (but not a higher dynamic range) than either SLM.

Figure 13:
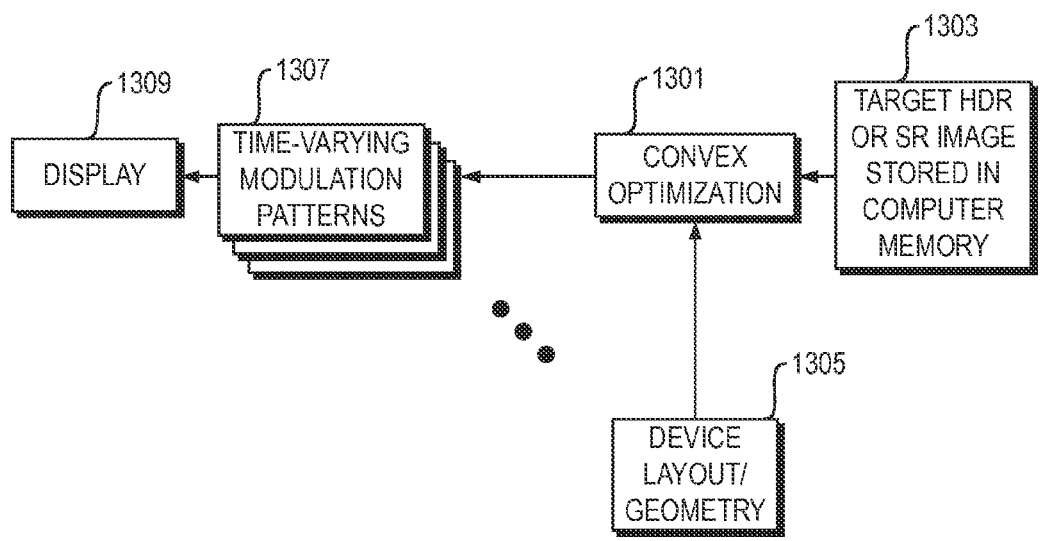
FIG. 13 is a flowchart showing steps in a method for using a light field projector and a diffusing screen to create a display that simultaneously exhibits both super-resolution and high dynamic range.

FIG. 13 is a flowchart showing steps in a method for using a light field projector and a diffusing screen to create a display that simultaneously exhibits both super-resolution (SR) and high dynamic range (HDR). One or more computer processors perform a convex optimization algorithm 1301, using as inputs both (a) a target image 1303 stored in computer memory; and (b) data indicative of device layout and geometry 1305. The target image 1303 has a higher dynamic range or a higher resolution (or both) than the optical modulators (e.g., SLMs) used in the projector system. The one or more computer processors output time-varying modulation patterns 1307 that are used to control the optical modulators (e.g., two dynamically controllable SLMs) to produce a super-resolved, HDR, light field display 1309.

Figure 14:
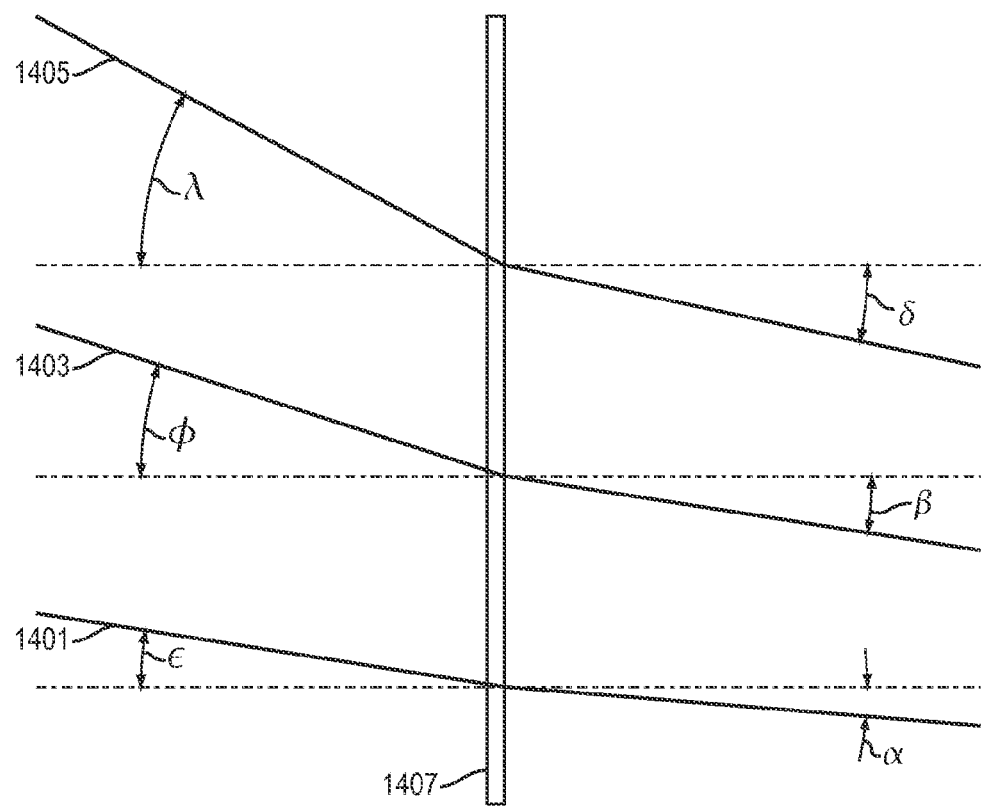
FIG. 14 shows a set of light rays passing through an angle-expanding screen.

FIG. 14 shows a set of light rays (1401, 1403, 1405) passing through an angle-expanding screen 1407. In the example shown in FIG. 14, the set of light rays strike a first side of the screen at a first set of angles ($\alpha$, $\beta$, $\delta$) and exit a different, second side of the screen at a second set of angles ($\epsilon$, $\phi$, $\lambda$). The first set of angles (entrance angles) are within a range of entrance angles. The second set of angles is a function of the first set of angles. For example, the function can be linear.

In the example shown in FIG. 14: (a) light ray 1401 enters the screen at angle $\alpha$ and exits the screen at angle $\epsilon$; (b) the magnitude of angle $\epsilon$ is larger than the magnitude of angle $\alpha$; (c) light ray 1403 enters the screen at angle $\beta$ and exits the screen at angle $\phi$; (d) the magnitude of angle $\phi$ is larger than the magnitude of angle $\beta$; (e) light ray 1405 enters the screen at angle $\delta$ and exits the screen at angle $\lambda$; and (f) the magnitude of angle $\lambda$ is larger than the magnitude of angle $\delta$.

In the example shown in FIG. 14: angle $\alpha$ is −5 degrees; angle $\beta$ is −10 degrees; angle $\delta$ is −15 degrees; angle $\epsilon$ is +10 degrees; angle $\phi$ is +20 degrees; and angle $\lambda$ is +30 degrees.

In the example shown in FIG. 14: (a) a set of light rays (1401, 1403, 1405) strike a first side of the screen at a set of entrance angles and exit a second, different side of the screen at a set of exit angles; (b) for each light ray in this set, the magnitude of the exit angle is larger than the magnitude of the entrance angle; and (c) light rays (1401, 1403, 1405) all have entrance angles that are within an interval (range) of entrance angles, which interval does not include the angle zero.

In the example shown in FIG. 14, the angle-expanding screen 1407 can be said to preserve and expand the angles of the incident light.

The angle-expanding screen 1407 may comprise an array of optical elements (e.g., lenslets or lenticules)

In this discussion of FIG. 14, angles are defined relative to a direction that is perpendicular to a surface of the screen 1407.

In exemplary implementations of the invention, light rays enter an angle-expanding screen at a set of entrance angles and exit the screen at a set of exit angles. Over at least a range of entrance angles: (a) entrance angles map to exit angles according to a function; and (b) for each light ray, the magnitude of ray's exit angle is greater than the magnitude of the ray's entrance angle, if the entrance angle is not zero. Preferably, the function is linear. However, the function may be non-linear.

Figure 15:
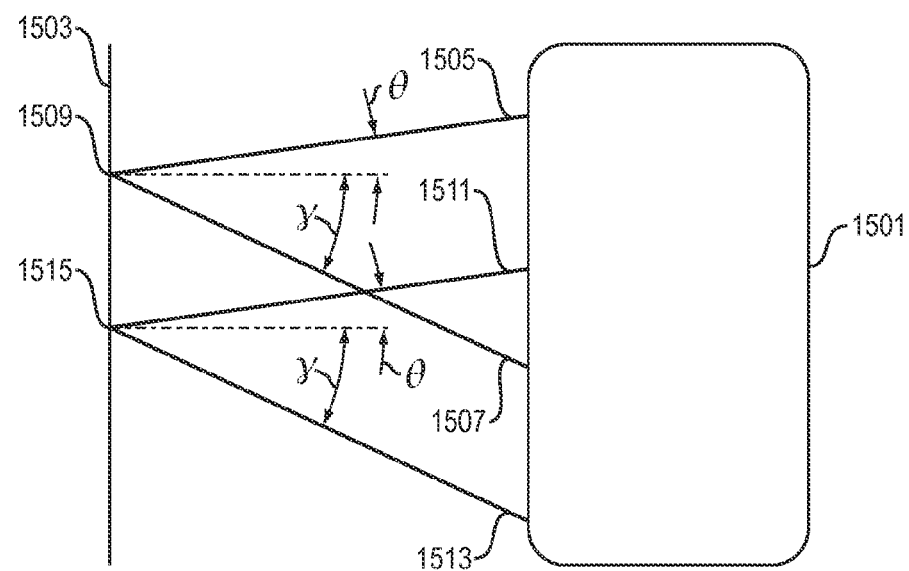
FIG. 15 shows a light field projector projecting light onto a plane.

FIG. 15 shows a light field projector 1501 projecting light onto a plane 1503. In the example shown in FIG. 15, a set of light rays 1505, 1507, 1509, 1511 from the projector arrives at plane 1503. Light rays 1507 and 1513 are each at angle $\gamma$ and light rays 1505 and 1511 are each at angle $\theta$. Light rays 1505 and 1507 comprise some of the light rays in a first view of the 3D image; and light rays 1509 and 1511 comprise some of the light rays in a second view of the 3D image. These two views show the 3D image from different angles.

The light field projector 1501 can control the intensity of light ray 1507 independently of the intensity of light ray 1505, even though these two light rays both intersect plane 1503 at point 1509. Likewise, the projector can control the intensity of light ray 1511 independently of the intensity of light ray 1513, even though these two light rays both intersect plane 1503 at point 1515.

The position of plane 1503 may vary, depending on the particular implementation. For example, plane 1503 may be co-located with an angle-expanding screen (e.g., 803 or 1403), or may be co-located with a diffusing screen 1201.

In the example shown in FIG. 15, the light field projector 1501 projects a set of light rays onto a region of plane 1503. The region includes points 1509 and 1515. This projection is such that a first subset of this set of light rays strikes the region at a first angle γ, and a second subset of this set of light rays strikes the region at a second angle θ. Angle γ is different than angle θ. The first subset of light rays includes rays 1507, 1513. The second subset of light rays includes rays 1505, 1511. The intensity of the lights rays in the first subset can vary as a first function of time, and the intensity of the light rays in the second subset can vary as a second function of time. The light field projector can control the intensity of the first subset of rays independently of the intensity of the second subset of rays.

In the example shown in FIG. 15, points 1509 and 1515 are in the same region of plane 1503. For example, the region may be a single pixel.

Alternatively, points 1509 and 1515 may be located at different pixels, in different regions of plane 1503. In that case (where the points 1509 and 1515 are at different pixels): (a) the light field projector 1501 can control the intensity of light ray 1507 independently of the intensity of light ray 1513, even though these two light rays both intersect plane 1503 at angle γ; and (b) the projector can control the intensity of light ray 1511 independently of the intensity of light ray 1505, even though these two light rays both intersect plane 1503 at angle θ.

In this discussion of FIG. 15, angles are defined relative to a direction that is perpendicular to plane 1503.

The attached drawings, including FIG. 14 or 15, are not necessarily drawn to scale. For example, some features may be enlarged for clearer presentation.

In exemplary implementations of this invention, one or more electronic processors are specially adapted: (1) to control the operation of hardware components of a light field projector, including one or more SLMs or other dynamically changing optical elements; (2) to perform light field factorization computations; (3) to perform optimization calculations, including convex optimization calculations; (4) to perform calculations to compute time-varying modulation patterns (e.g., to control one or more SLMs); (5) to output signals for controlling transducers for outputting information in human perceivable format, and (6) to process data, perform computations, and control the read/write of data to and from memory devices. The one or more processors may be located in any position or position within or outside of the projection system. For example: (a) at least some of the one or more processors may be embedded or housed within the light field projector; and (b) at least some of the one or more processors may be remote from other components of the light field projector. The one or more processors may be connected to each other or to other components in the light field projector either: (a) wirelessly, (b) by wired connection, or (c) by a combination of wired and wireless connections. For example, one or more electronic processors (e.g., 109) may be housed in a computer.

Definitions:

Here are a few definitions and clarifications. As used herein:

The terms "a" and "an", when modifying a noun, do not imply that only one of the noun exists.

An "automultiscopic" or "glasses-free 3D" display is a display, on or through a flat screen, of a 3D image, which display, when viewed by a human not wearing glasses or other optical apparatus: (a) exhibits motion parallax and binocular parallax, and (b) includes multiple views, the view seen depending on the angle at which the image is viewed.

The term "comprise" (and grammatical variations thereof) shall be construed broadly, as if followed by "without limitation". If A comprises B, then A includes B and may include other things.

As used herein, two vectors that are translates of each other (i.e., two equivalent vectors) point in the same "direction".

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The term "for instance" mean for example.

In the context of a display device (e.g., a projector or flat screen device), "front" is optically closer to a human viewer, and "rear" is optically further from the viewer, when the viewer is viewing a display produced by the device during normal operation of the device. The "front" and "rear" of a display device continue to be the front and rear, even when no viewer is present. In the context of a camera (or components of the camera), "front" is optically closer to the scene being imaged, and "rear" is optically further from the scene, during normal operation of the camera.

The terms "horizontal" and "vertical" shall be construed broadly. For example, "horizontal" and "vertical" may refer to two arbitrarily chosen coordinate axes in a Euclidian two dimensional space.

The term "include" (and grammatical variations thereof) shall be construed broadly, as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure and radiant energy density.

The term "light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

A "light field", also called a "light field function", means a mathematical description of intensity, spatial position and direction of light rays in a region. Typically, in practice, a light field does not describe all light rays actually faring in a physical region, but instead describes a finite subset of such light rays.

The term "light field projector" means a projector that is configured to project a set of light rays onto a region of a plane such that: (i) a first subset of the set of light rays strikes the region at a first angle, and a second subset of the set of light rays strikes the region at a second angle, the first and second angles being different; (ii) the intensity of the lights rays in the first subset varies as a first function of time, and the intensity of the light rays in the second subset can varies as a second function of time, and (iii) the projector can control the intensity of the first subset of rays independently of the intensity of the second subset of rays. In the preceding sentence, angles are defined relative to a direction that is perpendicular to the plane. For example, the region of the plane may consist of a single pixel.

"Light field information" means information that specifies spatial position, direction and intensity of a single light ray or of a set of light rays.

The term "magnitude" means absolute value.

The term "matrix" includes a matrix that has two or more rows, two or more columns, and at least one non-zero entry. The term "matrix" also includes a vector that has at least one non-zero entry and either (a) one row and two or more columns, or (b) one column and two or more rows. However, as used herein, (i) a scalar is not a "matrix", and (ii) a rectangular array of entries, all of which are zero (i.e., a so-called null matrix), is not a "matrix".

To "multiply" includes to multiply by an inverse. Thus, to "multiply" includes to divide.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

"Parallax" includes binocular parallax and motion parallax. A display exhibits binocular parallax, if the apparent position of an object viewed by the left eye and the right eye of a human viewer differs because of the different positions of the two eyes. A display exhibits motion parallax, if the apparent position of an object appears to change as the viewpoint of the human viewer moves (e.g., by moving the viewer's head).

To vary something "per pixel" means to vary it at respective pixels.

To compute a term that "satisfies" an equation: (a) does not require that calculations involve terms, variables or operations that are in the equation itself, as long as the term itself (subject to error, as described in part (b) of this sentence) is computed; and (b) includes computing a solution that differs from a correct solution by an error amount, which error amount arises from one or more of (i) rounding, (ii) other computational imprecision, including error due to modeling a continuous signal by a discrete signal or due to using an insufficiently small step size in calculations, and (iii) signal noise or other physical limitations of sensors or other physical equipment.

As used herein, the term "set" does not include a so-called empty set (i.e., a set with no elements).

A "spatial light modulator", also called an "SLM", is a device that (i) either transmits light through the device or reflects light from the device, and (ii) attenuates such light, such that the amount of attenuation of a light ray incident at a point on a surface of the device depends on at least the 2D spatial position of the point on the surface. A modulation pattern displayed by an SLM may be either time-invariant or time-varying.

As used herein, a "subset" of a set consists of less than all of the elements of the set.

The term "such as" means for example.

A matrix may be indicated by a bold capital letter (e.g., D). A vector may be indicated by a bold lower case letter (e.g., α).

However, the absence of these indicators does not indicate that something is not a matrix or not a vector.

A "Defined Term" means a term that is set forth in quotation marks in this Definitions section. Applicant is acting as Applicant's own lexicographer for the Defined Terms. This Definitions section shall, in all cases, control over and override any other definition of the Defined Terms. For example, the definitions of Defined Terms set forth in this Definitions section override common usage or any external dictionary.

If a given term is not set forth in quotation marks in this Definitions section, but is explicitly or implicitly defined elsewhere in this document, then the explicit or implicit definition of the given term set forth in this document shall, in all cases, control over and override any external definition of the given term.

If a particular term is not explicitly or implicitly defined in this document, but this document provides some clarification regarding the meaning of the particular term, then the clarification of the given term set forth in this document shall, to the extent applicable, control over and override any external definition of the given term.

Variations:

This invention may be implemented in many different ways, in addition to those described above.

Here are some non-limiting examples of how this invention may be implemented:

This invention may be implemented as a method that comprises using a light field projector to project a set of light rays onto a screen, wherein: (a) each respective light ray, out of the set of light rays, enters a first side of the screen at an entrance angle and exits a second, different side of the screen at an exit angle; and (b) over an interval of the entrance angles, which interval does not include the angle zero, the magnitude of the exit angle of each respective light ray is greater than the magnitude of the entrance angle of the respective light ray; angles in each case being defined relative to a direction that is perpendicular to the screen. Furthermore: (1) the light rays may create an automultiscopic display; (2) the automultiscopic display may exhibit parallax in only a first dimension; (3) a diffuser that is positioned before or after the screen may diffuse light, such that a light ray impacting the diffuser is spread only in a plane that is perpendicular to the first dimension; (4) the display may exhibit parallax in two different directions, the two different directions being perpendicular to each other; (5) the screen may comprise a first planar array of optical elements and a second planar array of optical elements, the optical elements in each case may be lenslets or lenticules, and a plane located between the first and second planar arrays may be conjugate to optical elements of the first planar array and to optical elements of the second planar array; (6) the screen may comprise a first planar array of lenticules and a second planar array of lenticules; (7) the screen may comprise a first planar array of lenslets and a second planar array of lenslets; (8) within the light field projector, light may be transmitted through or reflected from two or more spatial light modulators that each display time-varying spatial light modulation patterns; (9) the light field projector may include a coded aperture; and (10) over the interval of entrance angles, the exit angles of the respective light rays may map to the entrance angles of the respective light rays according to a linear function.

This invention may be implemented as a system comprising, in combination (a) a screen; and (b) a light field projector for projecting light onto the screen, wherein the screen is configured such that, over a range of entrance angles, for each light ray that enters a first side of the screen at a non-zero entrance angle and exits a second, different side of the screen at an exit angle: (1) the entrance angle has a first magnitude, (2) the exit angle has a second magnitude, and (3) the second magnitude is larger than the first magnitude; angles being defined relative to a direction that is perpendicular to the screen. Furthermore, the light field projector may be configured to project an automultiscopic display on or through the screen.

This invention may be implemented as a method comprising using a light field projector to project light rays through a focusing lens onto a diffusive screen, which screen is either transmissive or reflective. Furthermore: (1) the light field projector may comprise a first spatial light modulator and a second light modulator; (2) the first spatial light modulator may display a first spatial light attenuation pattern, the second spatial light modulator may display a second spatial light attenuation pattern, an image projected on the screen may comprise a product of the first and second patterns, and the image may have a higher spatial resolution than the first spatial light modulator and a higher spatial resolution than the second light modulator; and (3) the image may have a higher dynamic range than the first spatial light modulator and a higher dynamic range than the second light modulator.

This invention may be implemented as a system comprising, in combination: (a) a diffusive screen, which screen is either transmissive or reflective; (b) a focusing lens; and (c) a light field projector for projecting light through the focusing lens onto the screen. Furthermore: (1) the light field projector may include a first spatial light modulator and a second spatial light modulator, and the projector may be configured such that, during the projecting (i) the first spatial light modulator displays a first spatial light attenuation pattern, (ii) the second spatial light modulator displays a second spatial light attenuation pattern, (iii) an image projected on the screen comprises a product of the first and second patterns, and (iv) the image has a higher spatial resolution than the first spatial light modulator and a higher spatial resolution than the second light modulator; and (2) the image may have a higher dynamic range than the first spatial light modulator and a higher dynamic range than the second light modulator.

CONCLUSION

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention. Numerous modifications may be made by one of ordinary skill in the art without departing from the scope of the invention.

What is claimed is:

1. A method that comprises using a light field projector to project a set of light rays onto a screen, wherein:
    (a) each respective light ray, out of the set of light rays, enters a first side of the screen at an entrance angle and exits a second, different side of the screen at an exit angle; and
    (b) over an interval of the entrance angles, which interval does not include the angle zero, the magnitude of the exit angle of each respective light ray is greater than the magnitude of the entrance angle of the respective light ray;
    angles in each case being defined relative to a direction that is perpendicular to the screen.

2. The method of claim 1, wherein the light rays create an automultiscopic display.

3. The method of claim 2, wherein the automultiscopic display exhibits parallax in only a first dimension.

4. The method of claim 3, wherein a diffuser that is positioned before or after the screen diffuses light, such that a light ray impacting the diffuser is spread only in a plane that is perpendicular to the first dimension.

5. The method of claim 2, wherein the display exhibits parallax in two different directions, the two different directions being perpendicular to each other.

6. The method of claim 1, wherein:
    (a) the screen comprises a first planar array of optical elements and a second planar array of optical elements;
    (b) the optical elements in each case are lenslets or lenticules;
    (c) a plane located between the first and second planar arrays is conjugate to optical elements of the first planar array and to optical elements of the second planar array.

7. The method of claim 1, wherein the screen comprises a first planar array of lenticules and a second planar array of lenticules.

8. The method of claim 1, wherein the screen comprises a first planar array of lenslets and a second planar array of lenslets.

9. The method of claim 1, wherein, within the light field projector, light is transmitted through or reflected from two or more spatial light modulators that each display time-varying spatial light modulation patterns.

10. The method of claim 1, wherein the light field projector includes a coded aperture.

11. The method of claim 1, wherein, over the interval of entrance angles, the exit angles of the respective light rays map to the entrance angles of the respective light rays according to a linear function.

12. A system comprising, in combination
    (a) a screen, and
    (b) a light field projector for projecting light onto the screen,
    wherein the screen is configured such that, over a range of entrance angles, for each light ray that enters a first side of the screen at a non-zero entrance angle and exits a second, different side of the screen at an exit angle:
    (1) the entrance angle has a first magnitude;
    (2) the exit angle has a second magnitude; and
    (3) the second magnitude is larger than the first magnitude;
    angles being defined relative to a direction that is perpendicular to the screen.

13. The system of claim 12, wherein the light field projector is configured to project an automultiscopic display on or through the screen.

14. A method comprising using a light field projector to project light rays through a focusing lens onto a diffusive screen, which screen is either transmissive or reflective, wherein:
    (a) the light field projector comprises a first spatial light modulator and a second light modulator;
    (b) the first spatial light modulator displays a first spatial light attenuation pattern;
    (c) the second spatial light modulator displays a second spatial light attenuation pattern;

(d) an image projected on the screen comprises a product of the first and second patterns; and
(e) the image has a higher spatial resolution than the first spatial light modulator and a higher spatial resolution than the second light modulator.

15. The method of claim 14, wherein the image has a higher dynamic range than the first spatial light modulator and a higher dynamic range than the second light modulator.

16. A system comprising, in combination:
(a) a diffusive screen, which screen is either transmissive or reflective;
(b) a focusing lens; and
(c) a light field projector for projecting light through the focusing lens onto the screen:
wherein
(i) the light field projector includes a first spatial light modulator and a second spatial light modulator; and
(ii) the projector is configured such that, during the projecting
  (A) the first spatial light modulator displays a first spatial light attenuation pattern;
  (B) the second spatial light modulator displays a second spatial light attenuation pattern;
  (C) an image projected on the screen comprises a product of the first and second patterns; and
  (D) the image has a higher spatial resolution than the first spatial light modulator and a higher spatial resolution than the second light modulator.

17. The system of claim 16, wherein the image has a higher dynamic range than the first spatial light modulator and a higher dynamic range than the second light modulator.

\* \* \* \* \*